US006614384B2

(12) United States Patent
Hall et al.

(10) Patent No.: US 6,614,384 B2
(45) Date of Patent: Sep. 2, 2003

(54) SYSTEM AND METHOD FOR DETECTING AN INTRUDER USING IMPULSE RADIO TECHNOLOGY

(75) Inventors: David J. Hall, Madison, AL (US); Scott M. Yano, Huntsville, AL (US); Hans G. Schantz, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/952,206

(22) Filed: Sep. 14, 2001

(65) Prior Publication Data

US 2002/0130807 A1 Sep. 19, 2002

Related U.S. Application Data

(60) Provisional application No. 60/232,562, filed on Sep. 14, 2000.

(51) Int. Cl.[7] .......................... G01S 13/56; G01S 13/00
(52) U.S. Cl. ........................ 342/28; 342/21; 342/27; 342/59; 342/118; 342/126; 342/450; 342/463; 342/465; 375/130; 375/140
(58) Field of Search ................ 342/27, 28, 52, 342/53, 54, 55, 56, 57, 58, 59, 73, 89, 90, 118, 134, 135–146, 175, 195, 21, 450–458, 461–465, 125–133; 375/130–153

(56) References Cited

U.S. PATENT DOCUMENTS

| | | | | |
|---|---|---|---|---|
| 3,882,493 A | * | 5/1975 | Bolger | 342/28 |
| 3,882,494 A | * | 5/1975 | Bolger | 342/28 |
| 3,922,660 A | * | 11/1975 | Galvin | 342/28 |
| 4,051,472 A | * | 9/1977 | Albanese et al. | 342/28 |
| 4,319,332 A | * | 3/1982 | Mehnert | 342/27 |
| 4,382,291 A | * | 5/1983 | Nakauchi | 342/27 |
| 4,641,317 A | | 2/1987 | Fullerton | |
| 4,813,057 A | | 3/1989 | Fullerton | |
| 4,952,939 A | | 8/1990 | Seed | |
| 4,979,186 A | | 12/1990 | Fullerton | |
| 5,363,108 A | | 11/1994 | Fullerton | |
| 5,521,600 A | | 5/1996 | McEwan | 342/27 |
| 5,677,927 A | | 10/1997 | Fullerton et al. | |
| 5,687,169 A | | 11/1997 | Fullerton | |
| 5,764,696 A | | 6/1998 | Barnes et al. | |
| 5,774,091 A | | 6/1998 | McEwan | 342/387 |
| 5,832,035 A | | 11/1998 | Fullerton | |
| 6,111,536 A | | 8/2000 | Richards et al. | |
| 6,133,876 A | | 10/2000 | Fullerton et al. | |
| 6,388,609 B2 | * | 5/2002 | Paese et al. | 342/27 |

FOREIGN PATENT DOCUMENTS

| | | | | |
|---|---|---|---|---|
| GB | | 2111736 A | * 7/1983 | G08B/13/00 |
| WO | WO 94/27168 A1 | | 11/1994 | |
| WO | WO 99/04283 A1 | | 1/1999 | |

OTHER PUBLICATIONS

P. Withington et al. "Preliminary Results of an Ultra–Wideband (Impulse) Scanning Receiver", IEEE MILCOM'99, dated Nov. 3, 1999, 5 pages.

(List continued on next page.)

*Primary Examiner*—Bernarr E. Gregory

(57) ABSTRACT

An intrusion detection system and method are provided that can utilize impulse radio technology to detect when an intruder has entered a protection zone. In addition, the intrusion detection system and method can utilize impulse radio technology to determine a location of the intruder within the protection zone and also track the movement of the intruder within the protection zone. Moreover, the intrusion detection system and method can utilize impulse radio technology to create a specially shaped protection zone before trying to detect when and where the intruder has penetrated and moved within the protection zone.

22 Claims, 25 Drawing Sheets

OTHER PUBLICATIONS

L. Larson et al. "A Si/SiGe HBT Timing Generator IC for High–Bandwidth Impulse Radio Applications", Custom Integrated Circuits Conference 1999, San Diego, CA, May 1999, 11 pages.

D.J. Hall "Indoor Propagation Analysis Techniques for Characterization of Ultr–Wideband RF Environments", Apr. 2000, 12 pages.

PCT International Search Report for International Application No. PCT/US01/28937 dated Mar. 20, 2002.

Taylor J.D. "Ultrawideband Radar" Microwave Symposium Digest, 1991, IEEE MTT–S International Boston, MA, USA Jun. 10–14, 1991, New York, NY, USA, IEEE, US, Jun. 10, 1991, pp. 367–370.

Win M. Z. et al. "Impulse Radio: How It Works" IEEE Communications Letters, IEEE Service Center, Piscataway, US, vol. 2, No. 2, Feb. 1998, pp. 36–38.

* cited by examiner

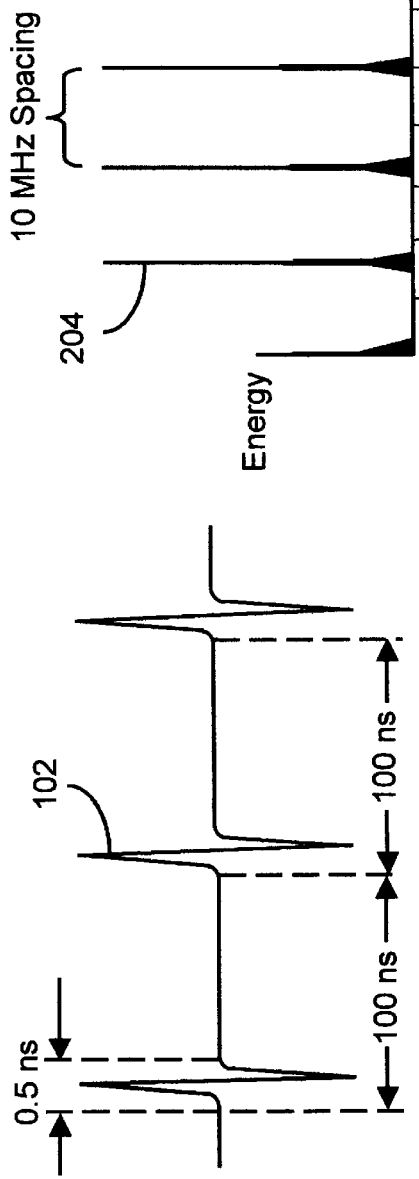
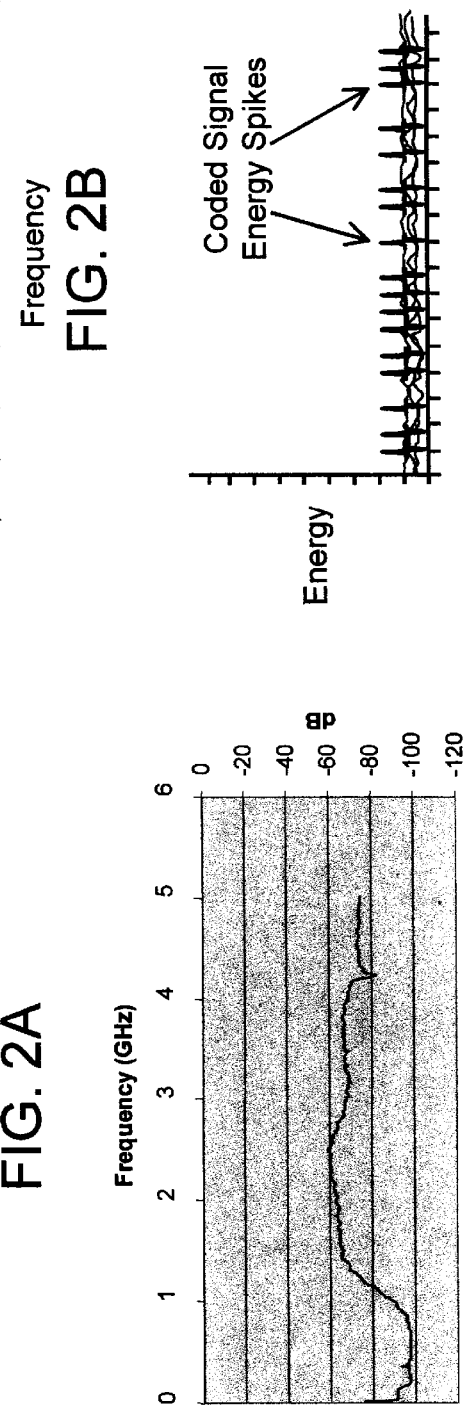
FIG. 2B
FIG. 2D
FIG. 2A
FIG. 2C

Early – Late Modulation

One of Many Modulation

Flip Modulation

Quad Flip Modulation

Vector Modulation

Corresponding to each Δt

SYSTEM AND METHOD FOR DETECTING AN INTRUDER USING IMPULSE RADIO TECHNOLOGY

CLAIMING BENEFIT OF PRIOR FILED PROVISIONAL APPLICATION

This application claims the benefit of U.S. Provisional Application Serial No. 60/232,562 filed on Sep. 14, 2000 and entitled "Ultra-Wideband Bistatic Radar for Target Detection/Position" which is incorporated by reference herein.

BACKGROUND OF THE INVENTION

1. Field of the Invention

The present invention relates in general to the security field and, in particular, to a system and method capable of using impulse radio technology to detect when an intruder has entered a protection zone and where in the protection zone the intruder is currently located.

2. Description of Related Art

Today there are many types of intrusion detection systems that can detect and signal an alarm if a person enters a protection zone. One type of an intrusion detection system uses sensors to detect an intruder where the sensors are placed on the doors, windows or any opening of a building that can be breached by the intruder. Thus, if an intruder opens a door or window a circuit in a sensor is interrupted and then the intrusion detection system sounds an alarm and/or alerts remote security personnel. This type of intrusion detection system can be employed only where a building or structure is available to support the wiring for the sensors.

Another type of intrusion detection system may use invisible beams of light, visible beams of light or narrow radar beams to effectively form a fence around a protection zone. Thus, if an intruder interrupts one of the beams then the intrusion detection system sounds an alarm and/or alerts remote security personnel. Unfortunately, if the intruder penetrates the fence without triggering the alarm then detection of that intruder by the intrusion detection system is unlikely.

Yet another type of intrusion detection system may use radar or ultrasonic energy throughout the area in the protection zone. Thus, if an intruder moves within the protection zone a Doppler shift in the radar or ultrasonic energy may be detected by the intrusion detection system which then sounds an alarm and/or alerts remote security personnel. Unfortunately, all of these intrusion detection systems and other well known intrusion detection systems can be easily jammed, hacked, spoofed or otherwise defeated by intruders. For instance, a slow moving intruder can trick the traditional intrusion detection system that uses narrow radar beams to form a fence around a protection zone. Accordingly, there is a need for an intrusion detection system and method that is essentially spoof-proof or very difficult for an intruder to defeat. This need and other needs are solved by the intrusion detection system and method of the present invention.

BRIEF DESCRIPTION OF THE INVENTION

The present invention includes an intrusion detection system and method that can utilize impulse radio technology to detect when an intruder has entered a protection zone. In addition, the intrusion detection system and method can utilize impulse radio technology to determine a location of the intruder within the protection zone and also track the movement of the intruder within the protection zone. Moreover, the intrusion detection system and method can utilize impulse radio technology to create a specially shaped protection zone before trying to detect when and where the intruder has penetrated and moved within the protection zone.

BRIEF DESCRIPTION OF THE DRAWINGS

A more complete understanding of the present invention may be had by reference to the following detailed description when taken in conjunction with the accompanying drawings wherein:

FIG. 2A illustrates a pulse train comprising pulses as in FIG. 1A;

FIG. 2B illustrates the frequency domain amplitude of the waveform of FIG. 2A;

FIG. 2C illustrates the pulse train spectrum;

FIG. 2D is a plot of the Frequency vs. Energy Plot and points out the coded signal energy spikes;

DETAILED DESCRIPTION OF THE INVENTION

Figure 1A:
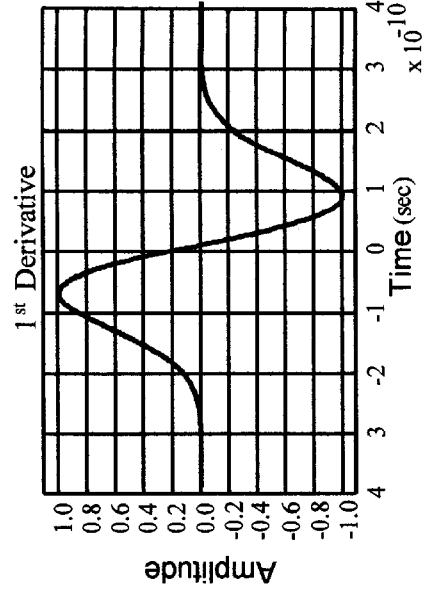
FIG. 1A illustrates a representative Gaussian Monocycle waveform in the time domain.
Figure 1B:
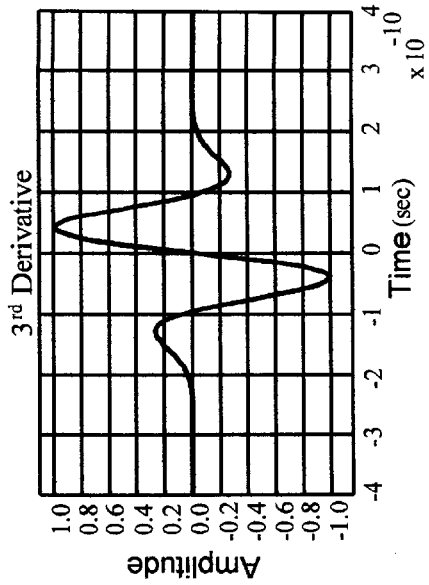
FIG. 1B illustrates the frequency domain amplitude of the Gaussian Monocycle of FIG. 1A.
Figure 1C:
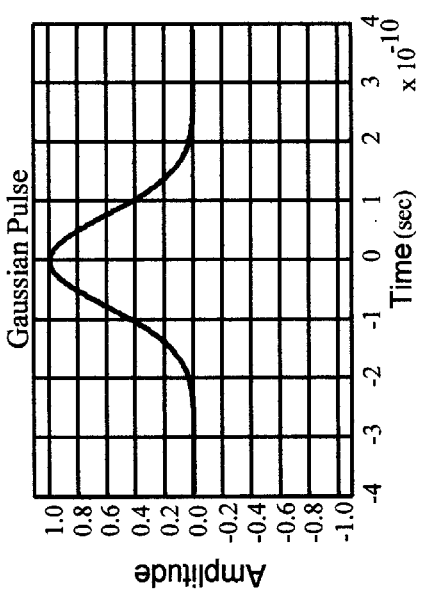
FIG. 1C represents the second derivative of the Gaussian Monocycle of FIG. 1A.
Figure 1D:
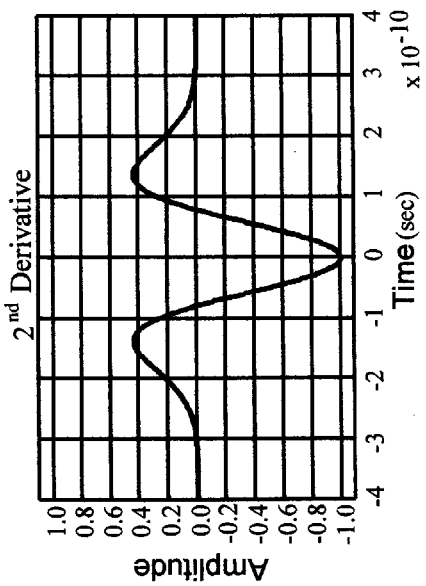
FIG. 1D represents the third derivative of the Gaussian Monocycle of FIG. 1A.

The present invention includes an intrusion detection system and method that can utilize impulse radio technology to detect when an intruder has entered a protection zone. In addition, the intrusion detection system and method can utilize impulse radio technology to determine a location of the intruder within the protection zone and also to track the movement of the intruder within the protection zone. Moreover, the intrusion detection system and method can utilize impulse radio technology to create a specially shaped protection zone before trying to detect when and where the intruder has penetrated and moved within the protection zone. Many of these capabilities are possible, due to the use of an emerging, revolutionary ultra wideband technology (UWB) called impulse radio technology (also known as impulse radio) which is a significant improvement over conventional radar technology and conventional radio technology.

Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al.

Uses of impulse radio systems are described in U.S. patent application Ser. No. 09/332,502, now U.S. Pat. No. 6,177,903, titled, "System and Method for Intrusion Detection using a Time Domain Radar Array" and U.S. patent application Ser. No. 09/332,503, titled, now U.S. Pat. No. 6,218,979, "Wide Area Time Domain Radar Array" both filed on Jun. 14, 1999 both of which are assigned to the assignee of the present invention. The above patent documents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
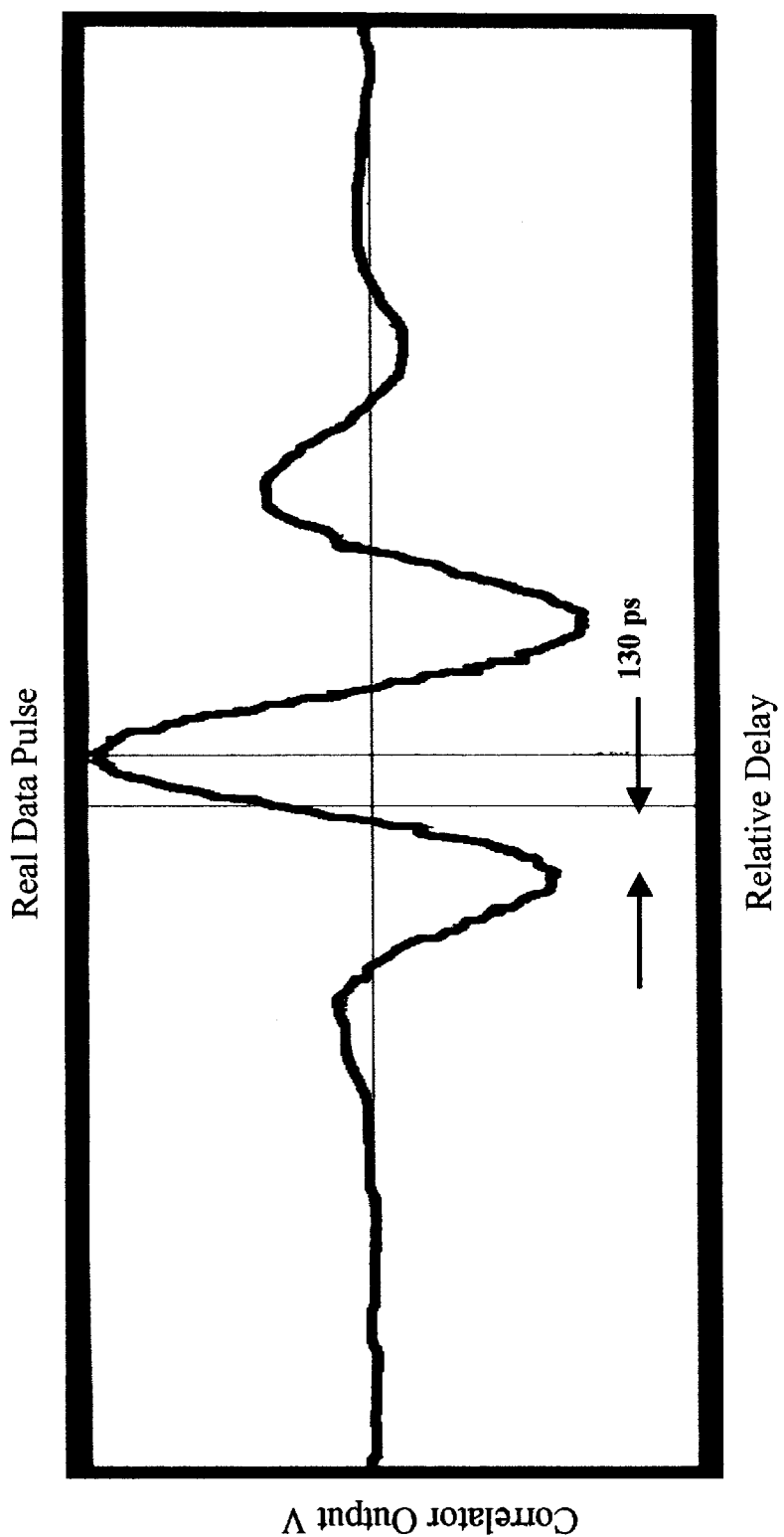
FIG. 1E represents the Correlator Output vs. the Relative Delay in a real data pulse.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where $\sigma$ is a time scaling parameter, t is time, and e is the natural logarithm base.

Figure 1F:
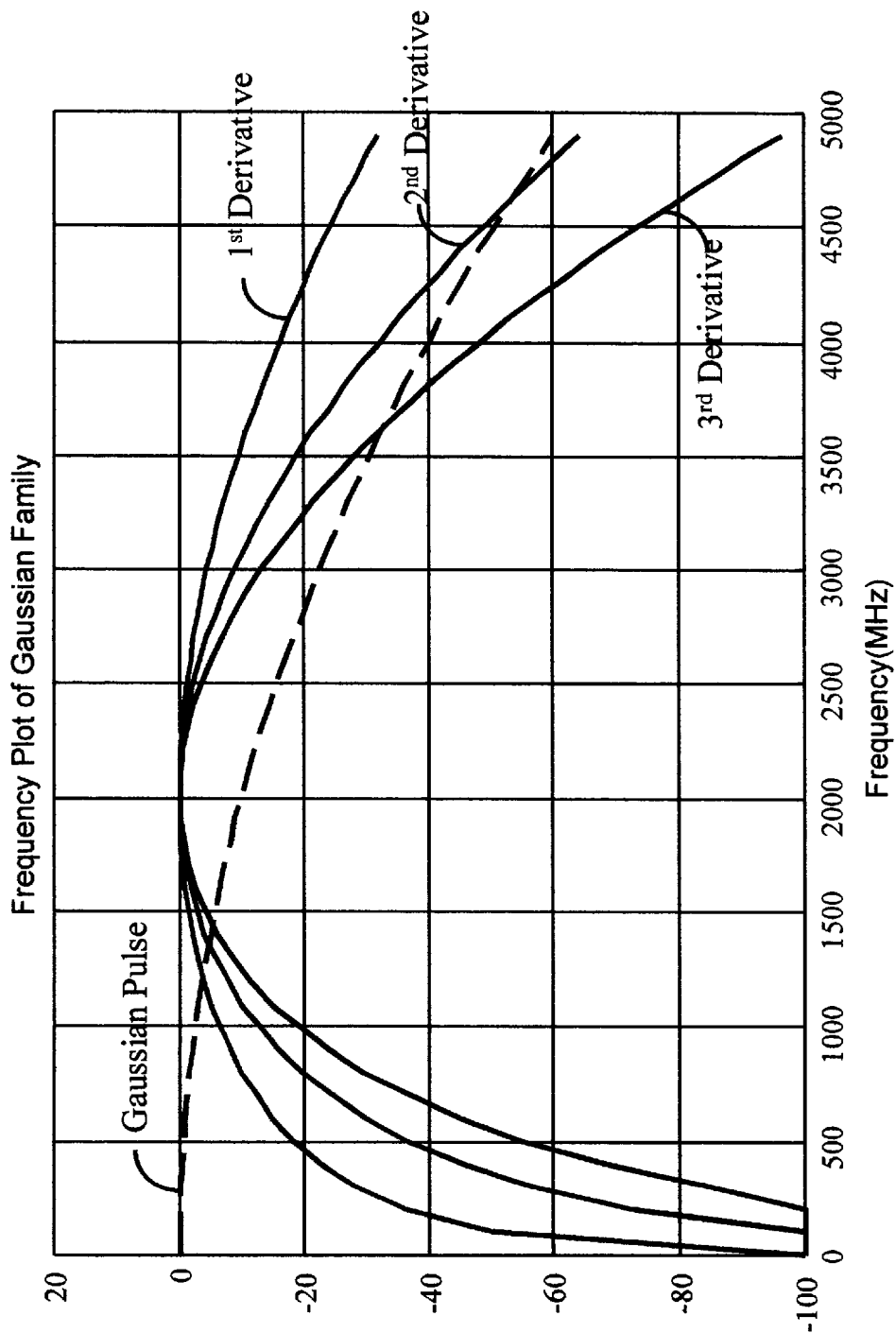
FIG. 1F graphically depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$), or frequency of peak spectral density, of the Gaussian monocycle is:

$$f_c = \frac{1}{2\pi\sigma}$$

It should be noted that the output of an ultra-wideband antenna is essentially equal to the derivative of its input. Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Pulse Trains

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, $\omega(t,b)$ is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left| \sum_{i=1}^{n} \frac{e^{j\Delta t}}{n} \right|$$

where $A(\omega)$ is the amplitude of the spectral response at a given frequency . . . $\omega$ is the frequency being analyzed ($2\pi f$), $\Delta t$ is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
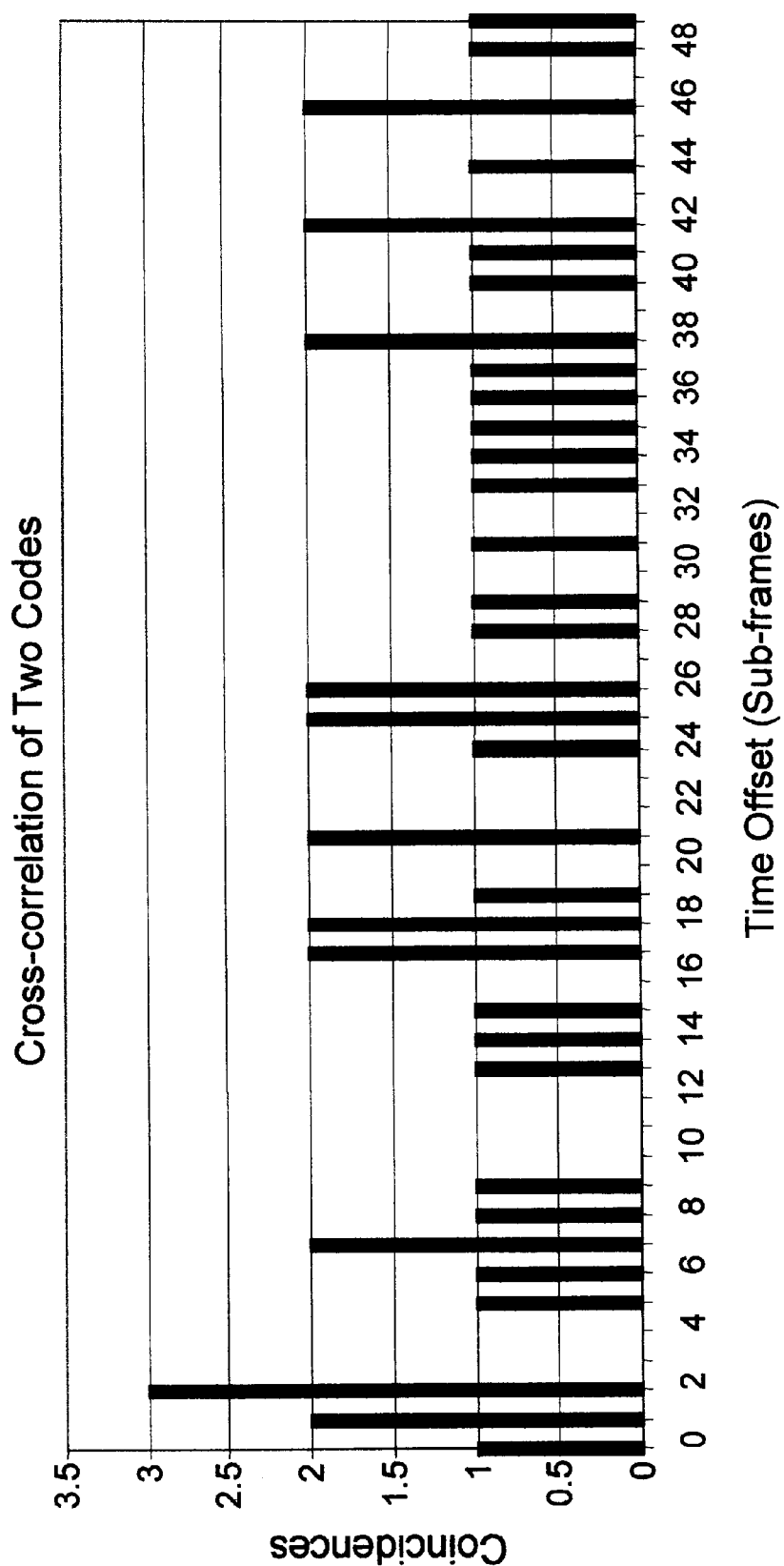
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$S_{tr}^{(k)}(t) = \sum_{j} (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t,b_j^{(k)})$ are the coded polarity, pulse amplitude, pulse type, pulse width, and normalized pulse waveform of the jth pulse of the kth transmitter, and $T_j^{(k)}$ is the coded time shift of the jth pulse of the kth transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register(s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Figure 4A:
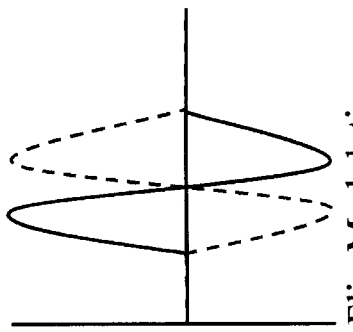
FIGS. 4A–4E graphically illustrate five modulation techniques to include: Early-Late Modulation; One of Many Modulation; Flip Modulation; Quad Flip Modulation; and Vector Modulation.

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A pulse train with conventional 'early-late' time-shift modulation can be expressed:

$$S_{tr}^{(k)}(t) = \sum_j (-1)^{f_j^{(k)}} a_j^{(k)} \omega\left(c_j^{(k)} t - T_j^{(k)} \delta d_{\lfloor j/N_s \rfloor}^{(k)}, b_j^{(k)}\right)$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t, b_j^{(k)})$ are the coded polarity, pulse amplitude, pulse type, pulse width, and normalized pulse waveform of the jth pulse of the kth transmitter, $T_j^{(k)}$ is the coded time shift of the jth pulse of the kth transmitter, $\delta$ is the time shift added when the transmitted symbol is 1 (instead of 0), $d^{(k)}$ is the data (i.e., 0 or 1) transmitted by the kth transmitter, and $N_s$ is the number of pulses per symbol (e.g., bit). Similar expressions can be derived to accommodate other proposed forms of modulation.

Figure 4B:
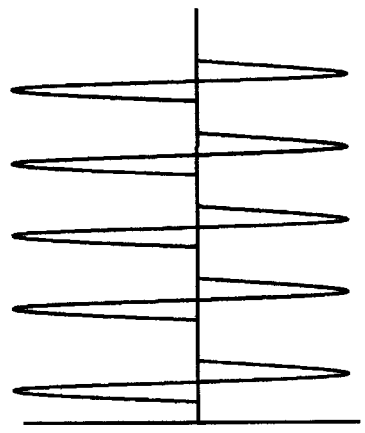

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," Attorney Docket No. 1659.0860000, filed Jun. 7, 2000, assigned to the assignee of the present invention, and incorporated herein by reference.

Figure 4C:
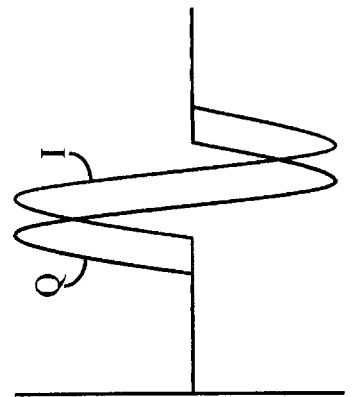
Figure 4D:
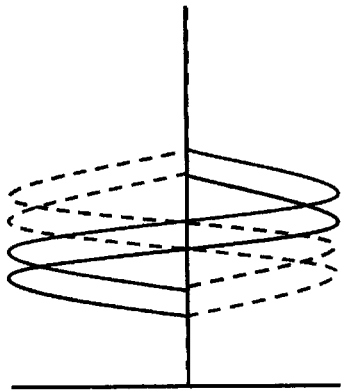

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Figure 4E:
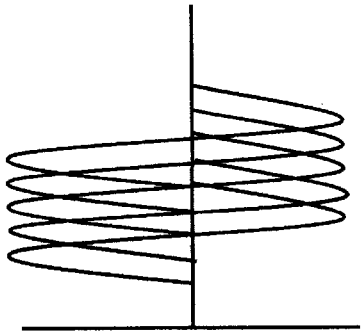

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Figure 5A:
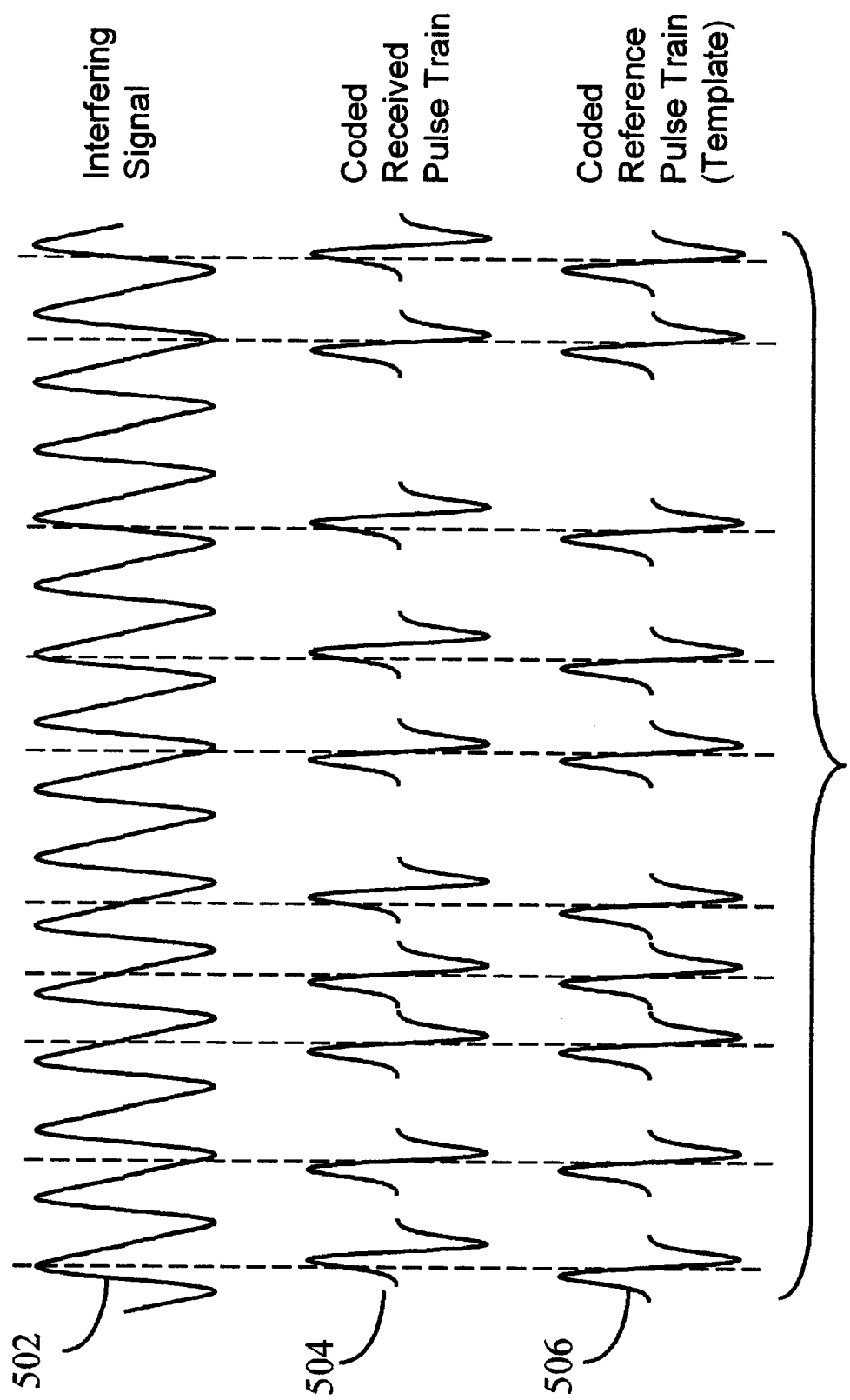
FIG. 5A illustrates representative signals of an interfering signal, a coded received pulse train and a coded reference pulse train.

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems. FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t-\delta)] dt$$

and $$\sigma_a^2 = T_f^{-1} \int_{-\infty}^{\infty} \left[ \int_{-\infty}^{\infty} \omega(t-s)v(t) dt \right]^2 ds,$$

where $\omega(t)$ is the monocycle waveform, $u(t)=\omega(t)-\omega(t-\delta)$ is the template signal waveform, $\delta$ is the time shift between the monocycle waveform and the template signal waveform, $T_f$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Figures 5B, 5C:
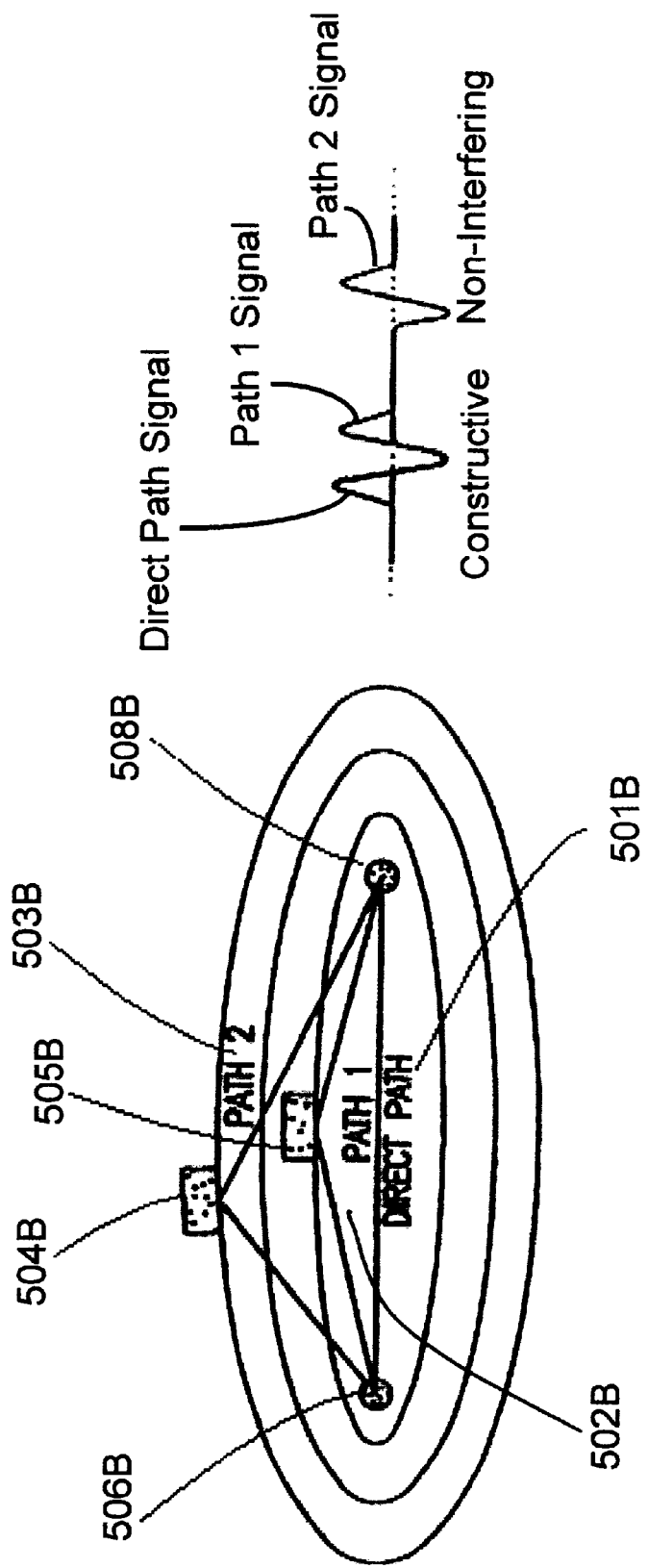
FIG. 5B depicts a typical geometrical configuration giving rise to multipath received signals.
FIG. 5C illustrates exemplary multipath signals in the time domain.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path 2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

Figure 5D:
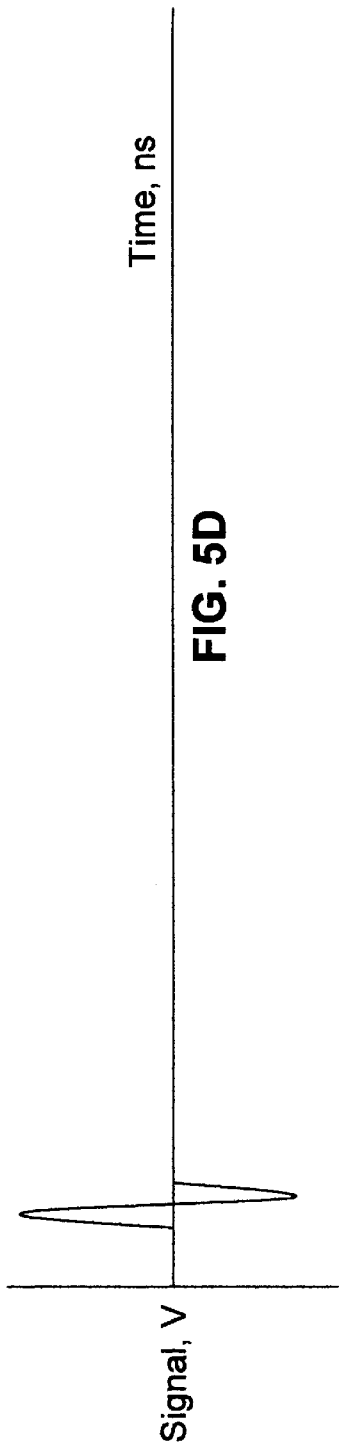
FIGS. 5D–5F illustrate a signal plot of various multipath environments.
Figure 5E:
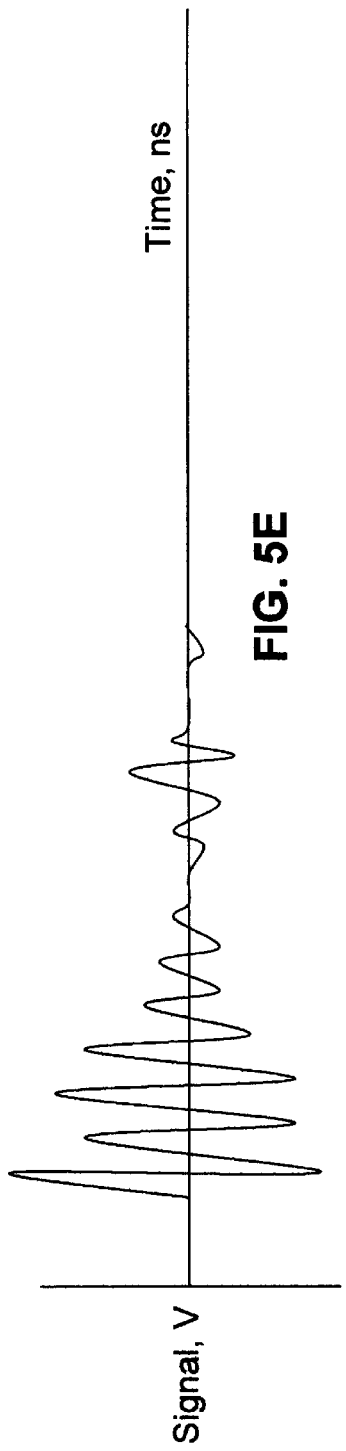
Figure 5F:
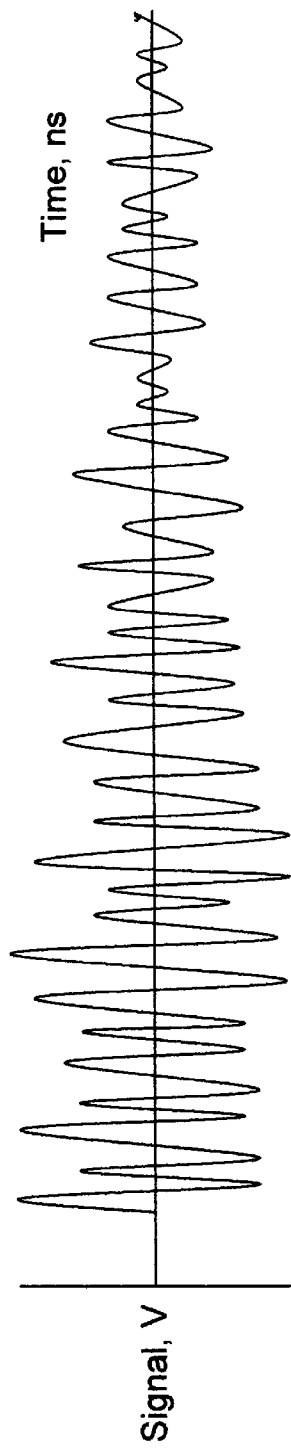

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

Figure 5G:
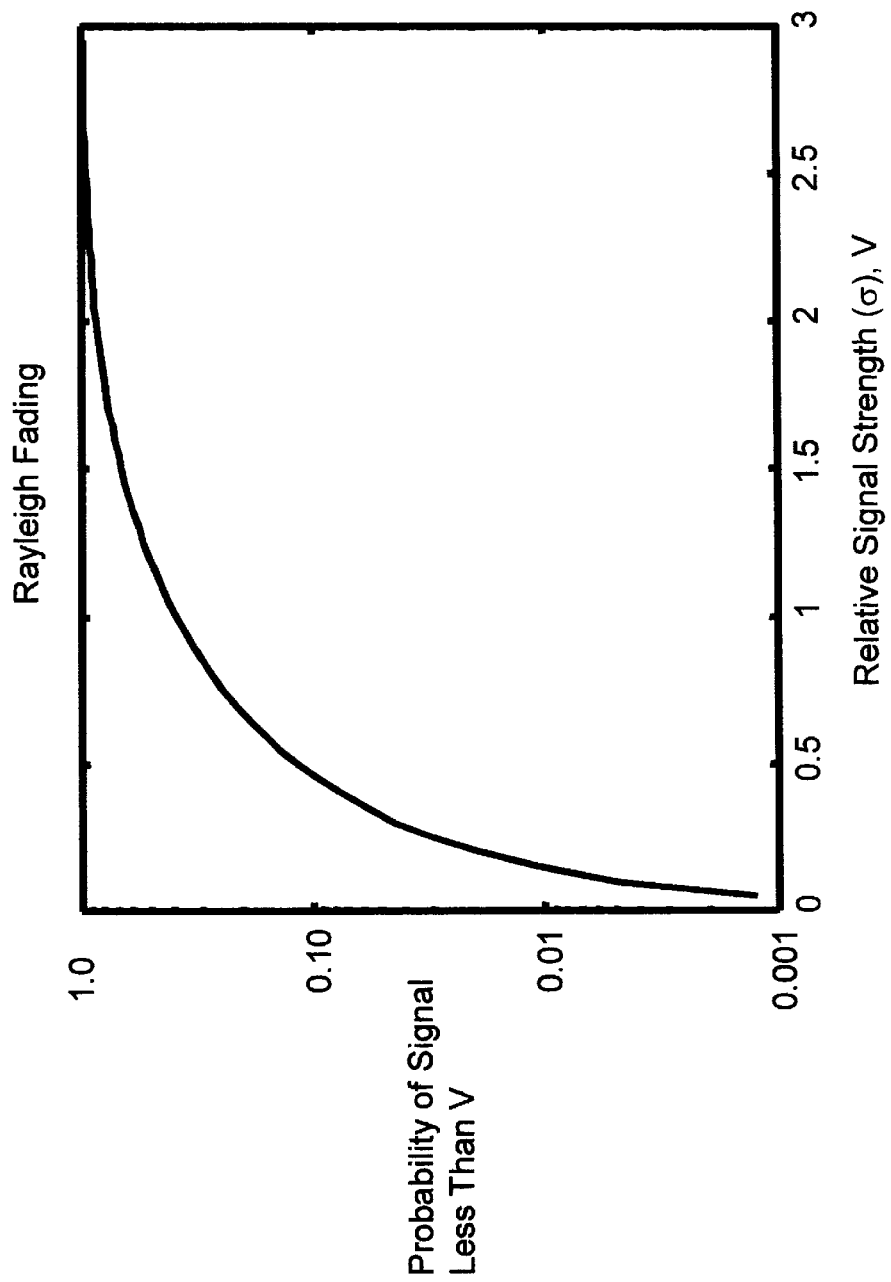
FIG. 5G illustrates the Rayleigh fading curve associated with non-impulse radio transmissions in a multipath environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of mulitipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 5B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2}\exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 5G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figures 5H, 5I:
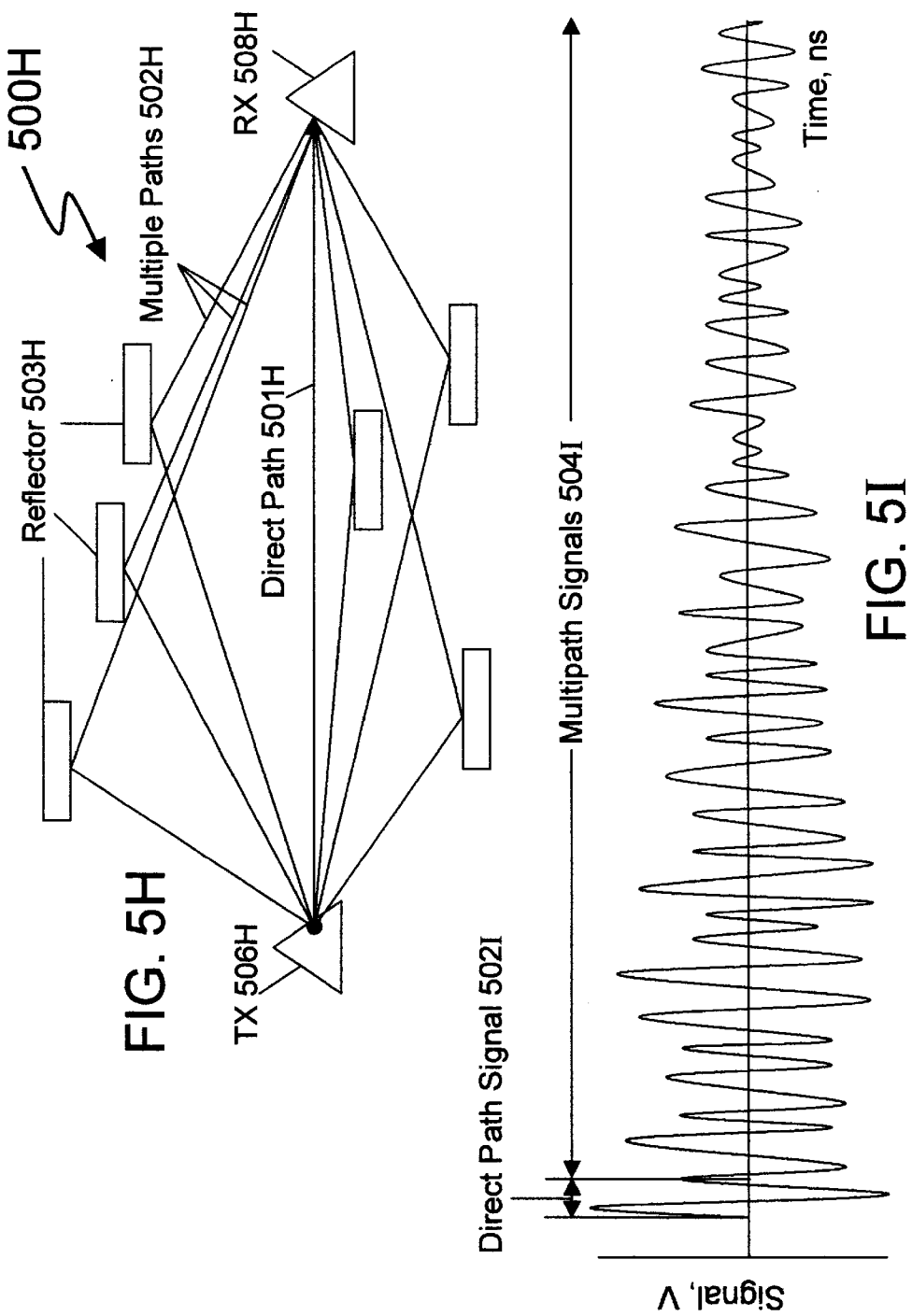
FIG. 5H illustrates a plurality of multipaths with a plurality of reflectors from a transmitter to a receiver.
FIG. 5I graphically represents signal strength as volts vs. time in a direct path and multipath environment.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIGS. 5H and 5I. FIG. 5H depicts an impulse radio system in a high multipath environment 500H consisting of a transmitter 506H and a receiver 508H. A transmitted signal follows a direct path 501H and reflects off reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. In the same manner described earlier for FIGS. 5B and 5C, the direct path signal 502I is sampled, while the multipath signals 504I are not, resulting in Rayleigh fading avoidance.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has no multi-cycle ambiguity, it is possible to determine waveform position to less than a wavelength, potentially down to the noise floor of the system. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method is described in co-owned, co-pending application titled "System and Method for Person or Object Position Location Utilizing Impulse Radio," application Ser. No. 09/456,409, filed Dec. 8, 1999, and incorporated herein by reference, now U.S. Pat. No. 6,300,903.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of impulse radio power control, see patent application titled "System and Method for Impulse Radio Power Control," application Ser. No. 09/332,501, filed Jun. 14, 1999, assigned to the assignee of the present invention, and incorporated herein by reference.

Mitigating Effects of Interference

A method for mitigating interference in impulse radio systems comprises the steps of conveying the message in packets, repeating conveyance of selected packets to make up a repeat package, and conveying the repeat package a plurality of times at a repeat period greater than twice the period of occurrence of the interference. The communication may convey a message from a proximate transmitter to a distant receiver, and receive a message by a proximate receiver from a distal transmitter. In such a system, the method comprises the steps of providing interference indications by the distal receiver to the proximate transmitter, using the interference indications to determine predicted noise periods, and operating the proximate transmitter to convey the message according to at least one of the following: (1) avoiding conveying the message during noise periods, (2) conveying the message at a higher power during noise periods, (3) increasing error detection coding in the message during noise periods, (4) re-transmitting the message following noise periods, (5) avoiding conveying the message when interference is greater than a first strength, (6) conveying the message at a higher power when the interference is greater than a second strength, (7) increasing error detection coding in the message when the interference is greater than a third strength, and (8) re-transmitting a portion of the message after interference has subsided to less than a predetermined strength.

For greater elaboration of mitigating interference in impulse radio systems, see the patent application titled "Method for Mitigating Effects of Interference in Impulse Radio Communication," application Ser. No. 09/587,033, filed Jun. 02, 1999, assigned to the assignee of the present invention, and incorporated herein by reference.

Moderating Interference in Equipment Control Applications

Yet another improvement to impulse radio includes moderating interference with impulse radio wireless control of an appliance. The control is affected by a controller remote from the appliance which transmits impulse radio digital control signals to the appliance. The control signals have a transmission power and a data rate. The method comprises the steps of establishing a maximum acceptable noise value for a parameter relating to interfering signals and a frequency range for measuring the interfering signals, measuring the parameter for the interference signals within the frequency range, and effecting an alteration of transmission of the control signals when the parameter exceeds the maximum acceptable noise value.

For greater elaboration of moderating interference while effecting impulse radio wireless control of equipment, see patent application titled "Method and Apparatus for Moderating Interference While Effecting Impulse Radio Wireless Control of Equipment," application Ser. No. 09/586,163, filed Jun. 2, 1999, and assigned to the assignee of the present invention, and incorporated herein by reference.

Exemplary Transceiver Implementation

Transmitter

Figures 6, 7:
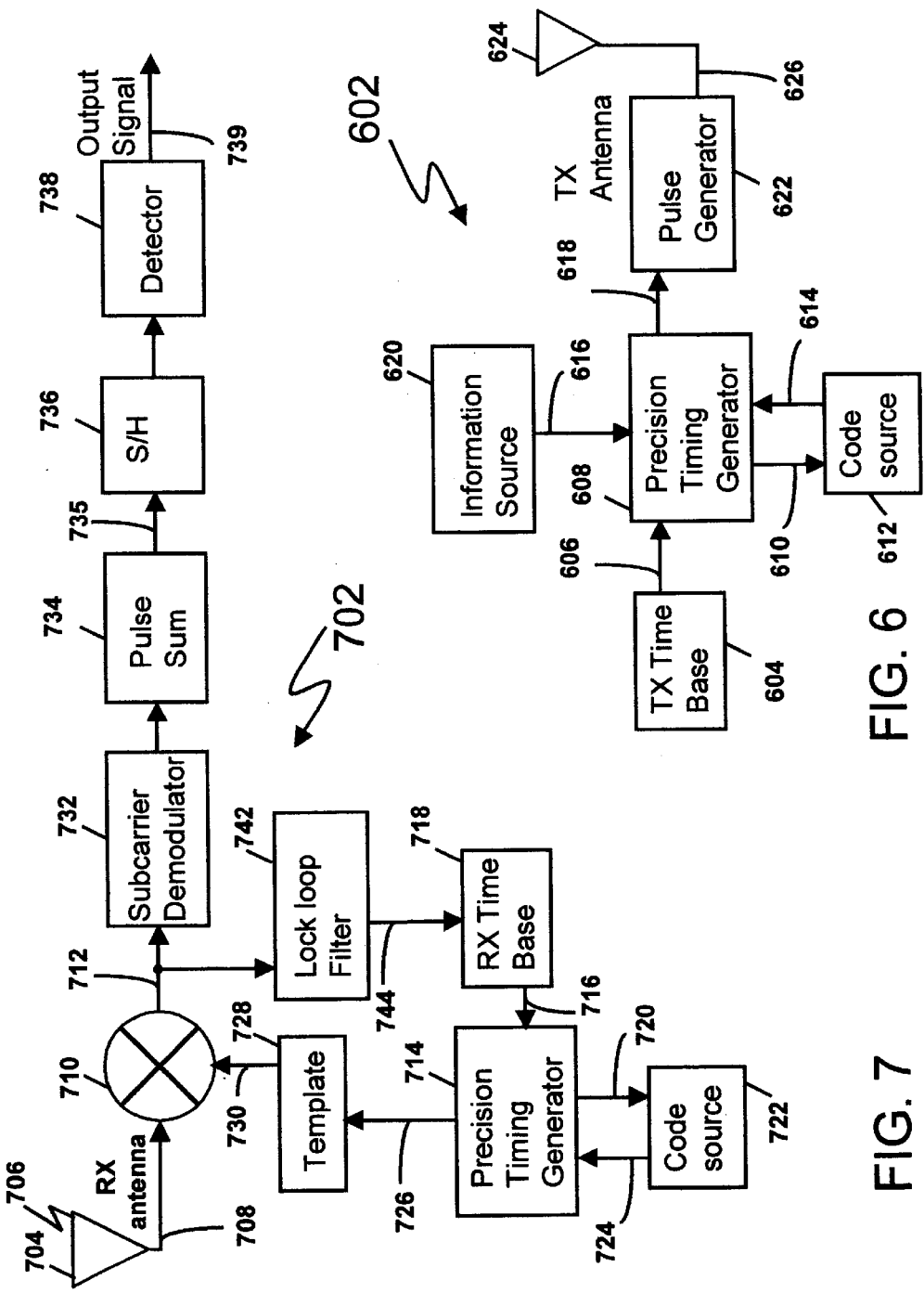
FIG. 6 illustrates a representative impulse radio transmitter functional diagram.
FIG. 7 illustrates a representative impulse radio receiver functional diagram.

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses are called the emitted signal, and propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 is coupled to a subcarrier demodulator 732, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to position in time the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
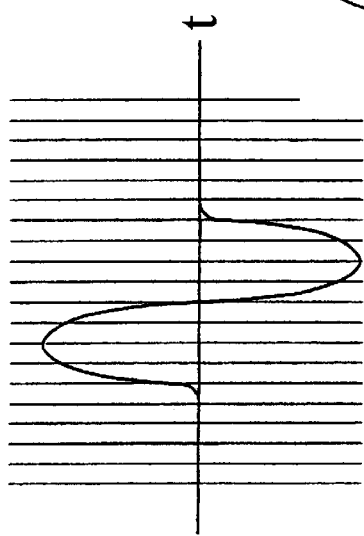
FIG. 8A illustrates a representative received pulse signal at the input to the correlator.
Figure 8B:
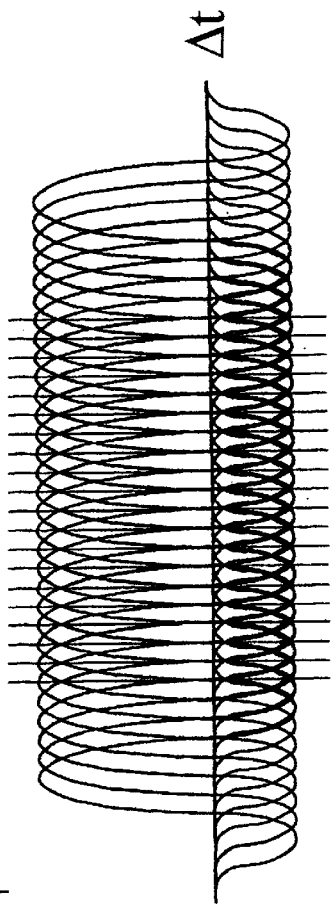
FIG. 8B illustrates a sequence of representative impulse signals in the correlation process.
Figure 8C:
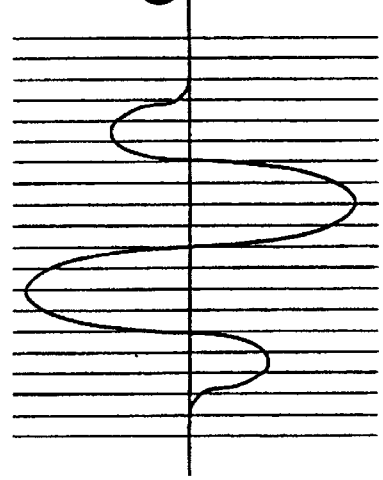
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the cross correlator for each of the time offsets of FIG. 8B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned co-pending application application Ser. No. 09/146,524, now U.S. Pat. No. 6,304,623, filed Sep. 3, 1998, titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics. Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see the patent application titled "Baseband Signal Converter for a Wideband Impulse Radio Receiver," application Ser. No. 09/356,384, filed Jul. 16, 1999, assigned to the assignee of the present invention, and incorporated herein by reference, now U.S. Pat. No. 6,421,389.

UWB Intrusion Detection System and Method

Referring to FIGS. 9–22, there are disclosed three embodiments of exemplary intrusion detection systems 1100, 1100' and 1100" and preferred methods 1600, 1600' and 1600" in accordance with the present invention.

Although the present invention is described as using impulse radio technology, it should be understood that the present invention can be used with any type of ultra wideband technology, but is especially suited for use with time-modulated ultra wideband technology. Accordingly, the exemplary intrusion detection systems 1100, 1100' and 1100" and preferred methods 1600, 1600' and 1600" should not be construed in a limited manner.

Generally, in the first embodiment, the intrusion detection system 1100 and method 1600 utilize impulse radio technology to detect when an intruder 1102 has entered a protection zone 1104 (see FIGS. 11 and 14–16). In the second embodiment, the intrusion detection system 1100' and method 1600' can utilize impulse radio technology to determine a location of the intruder 1102' within the protection zone 1104' and also track the movement of the intruder 1102' within the protection zone 1104' (see FIGS. 12 and 17–19). In the third embodiment, the intrusion detection system 1100" and method 1600" utilize impulse radio technology to create a specially shaped protection zone 1104" before trying to detect when and where the intruder 1102" has penetrated and moved within the protection zone 1104" (see FIGS. 13 and 20–21). Each of the three embodiments are briefly described below with respect to FIGS. 9–13 prior to describing each embodiment in greater detail with respect to FIGS. 14–21.

The present invention as described uses one or more ultra-wideband (UWB) scanning receivers 900 and a UWB transmitter 1000 as bistatic radar(s) to enable short-range target detection and positioning. The intrusion detection system described provides a robust, cost effective way for detecting the introduction of foreign objects including intruders of appreciable radar cross section (RCS) into a constrained and stationary environment such as a protection zone. Some of the benefits of implementing UWB technology for this application is that it enables the intrusion detection system to offer excellent time (distance) resolution, clutter rejection, and also enables the intrusion detection system to extend the range of coverage through barriers. In addition, due to the low transmit power, the intrusion detection system is resistant to both detection and jamming.

UWB Scanning Receiver and UWB Transmitter

Figure 9:
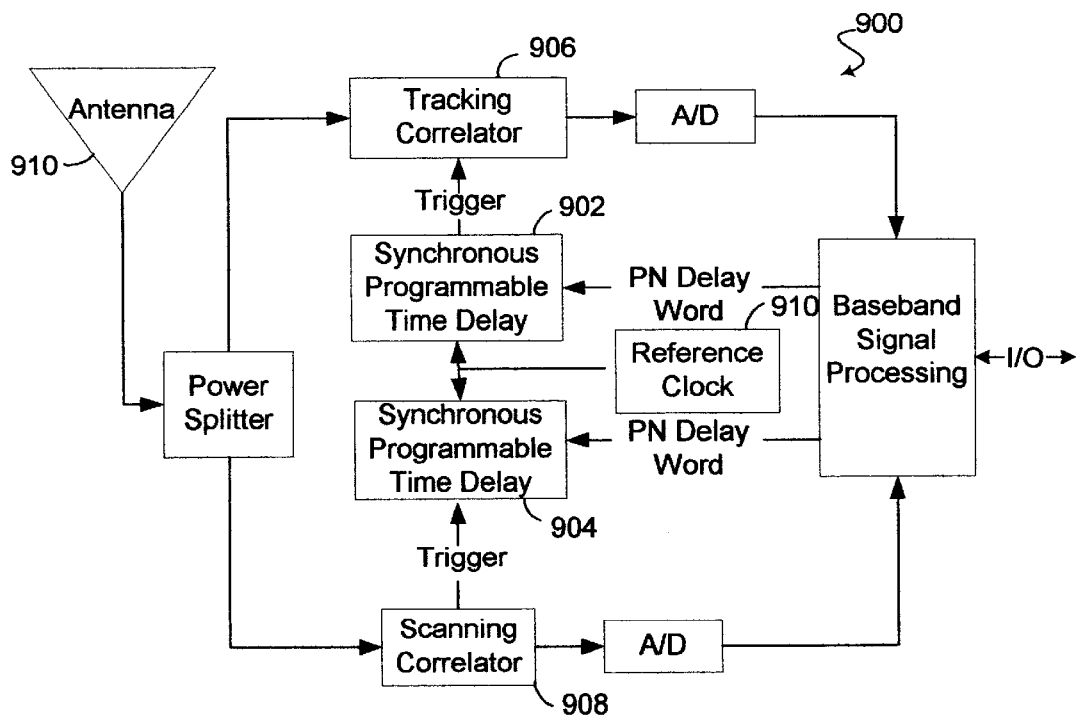
FIG. 9 illustrates an exemplary block diagram of an ultra-wideband scanning receiver that could be used in the present invention.
Figure 10:
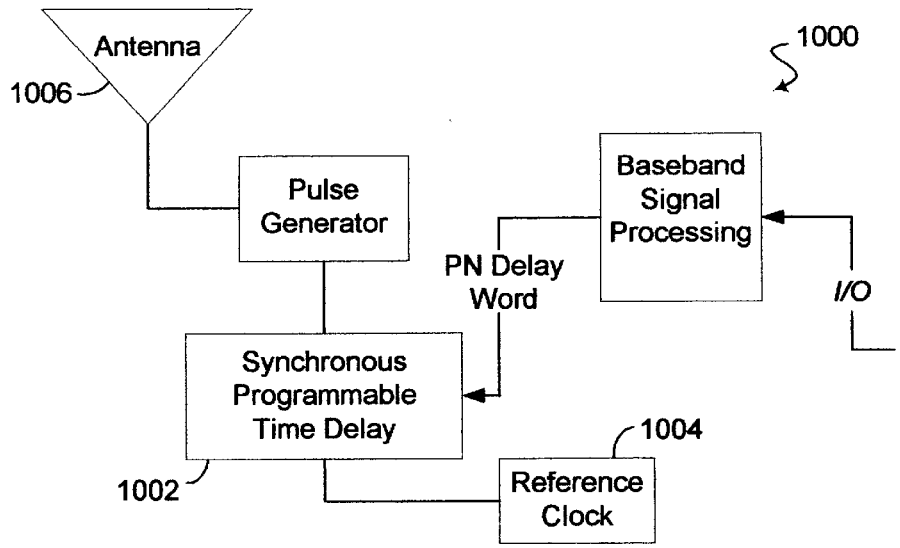
FIG. 10 illustrates an exemplary block diagram of an ultra-wideband scanning transmitter that could be used in the present invention.

FIGS. 9–10, illustrate exemplary block diagrams of the UWB scanning receiver 900 and its companion the UWB transmitter 1000. Time Domain Corporation has developed the UWB scanning receiver 900 that implements time-modulated ultra-wideband (TM-UWB) technology and utilizes short Gaussian monocycle pulses at relatively high pulse repetition frequencies (PRF). The pulse durations are less than 1 ns with a PRF exceeding 1 MHz. The interval between pulses is not fixed but is time coded using sequences of psuedo-random numbers. See, Withington, Reinhardt, and Stanley, "Preliminary Results of an Ultra-Wideband (Impulse) Scanning Receiver", Paper S38P3, Milcom 1999, Atlantic City, N.J., November 1999 which is incorporated herein.

In the implementation shown, the UWB transmitter 1000 emits a stream of 500 ps TM-UWB coded pulses at a PRF of 10 MHz using an independent timing system 1002 and 1004. The UWB scanning receiver 900 includes two correlators 906 and 908 each of which are controlled by an independent timing system 902, 904 and 910. Time Domain has also developed these precision, low noise synchronous programmable time delay integrated circuits 902, 904, 910, 1002 and 1004. See, L. Larson, et al., "A SI/Ge HBT Timing Generator IC for High Bandwidth Impulse Radio Applications," Custom Integrated Circuits Conference 1999, San Diego, Calif., May 1999 which is incorporated herein.

The tracking correlator 906 within the UWB receiver 900 synchronizes with and is able to track the received pulse train, providing coherent transmission. Any offset between the receiver's internal coded waveform and the received coded waveform is detected as an error voltage in the correlator's lock loop. A frequency offset is synthesized to offset the pseudo-random time hopping word, thus ensuring the receiver's clock 910 is within 20 ps RMS of the transmitter's clock 1004. Once the tracking correlator 906 is locked to the received signal, the scanning correlator 908 can sample the received waveform at precise time delays generating a complete picture of the received signal. This picture is representative of the actual distortion of the transmitted Gaussian waveform after being filtered by the environment.

It should be noted that the scanning correlator 908 can dwell at a time position for a user-specified number of integrated pulses to mitigate the effects of noise and other non-coherent interference. Time resolution steps as small as 3.052 ps can be specified but a typical time sample resolution is approximately 30 ps.

Implementing the UWB scanning receiver 900 in a multipath environment results in a scanning receiver output that represents a psuedo-channel impulse of the propagation channel. The multipath channel is characterized by the line of sight (LOS) signal (if one exists) along with delayed, attenuated copies of the transmitted signal corresponding to reflections off of objects including intruders in the environment. The multipath structure of the propagation channel is unique to the placement of objects in the protection zone as well as the placement of the transmit and receive antennas 1006 and 911, respectively. Assuming that the propagation environment is stationary (i.e. all reflective surfaces and antennas are fixed and no intruders are present), successive multipath scans taken by the scanning receiver 900 are identical. This can be verified to ensure stationarity via a simple subtraction and digital filtering of the successive scan waveforms. As described in greater detail below, the scan waveforms that are made when an intruder is not present are later compared to scan waveforms that are made when an intruder is present which enables the detection of the intruder. Further examples and details about the basic components within the UWB scanning receiver 900 and the UWB transmitter 1000 can be found in the commonly owned U.S. patent application Ser. No. 09/537,264, filed Mar. 29, 2000, entitled "System and Method of using Multiple Correlator Receivers in an Impulse Radio System" which is incorporated herein by reference.

Intruder Detection (First Embodiment)

Figure 11:
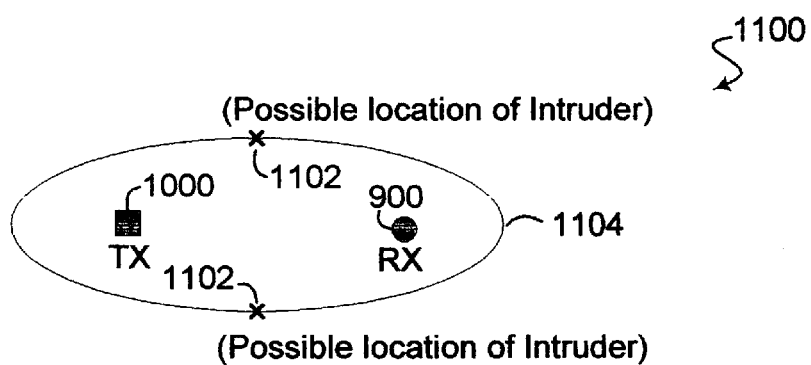
FIG. 11 illustrates a diagram of the basic components of a first embodiment of the intrusion detection system in accordance with the present invention (see also FIG. 14).

Referring to FIG. 11, there is illustrated a diagram of the basic components of the first embodiment of the intrusion detection system 1100. Basically, the intrusion detection system 1000 includes the UWB scanning receiver 900 and the UWB transmitter 1000 which together function as a bistatic radar to facilitate target detection. The introduction of any new object such as an intruder 1102 having an appreciable RCS into the environment alters the multipath structure of the protection zone 1104 and distorts the received scan waveform. The presence of the intruder 1102 is now detectable in the subtraction of successive scans; any significant change in a portion of this difference reveals the range of the intruder 1102 with respect to the placement of the UWB scanning receiver 900. Knowing the distance from the UWB transmitter 1000 to the UWB scanning receiver 900 and knowing the relative time delay of the target response in the scanned waveform, the position of the intruder 1102 is known to lie somewhere on an ellipse whose foci are the UWB transmitter 1000 and the UWB receiver 900. As illustrated, the intruder 1102 is located in one of two possible locations.

Empirical data has shown that for successive scans of an environment in which no intruder 1102 is present, limitations of the UWB scanning receiver 900 such as timer drift and small amplitude variations prevent successive scans from having perfect subtraction. This creates a certain clutter threshold in the subtracted waveform. The limitations of the UWB scanning receiver 900 require that the intruder 1102 introduced to the environment must reflect a return to the receive antenna 911 that is distinguishable from clutter. Effective filters and relevant thresholding techniques are used to combat this drift. Again, more details about the first embodiment of the intrusion detection system 1100 and various scanned waveforms are described below with respect to FIGS. 14–16.

Intruder Positioning (Second Embodiment)

Figure 12:
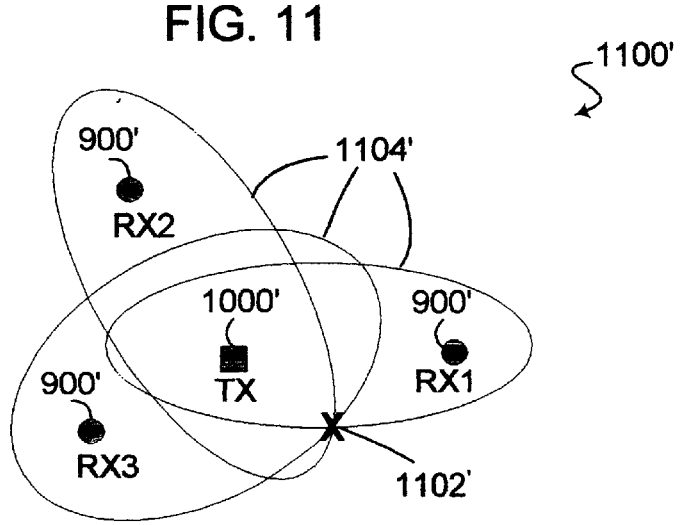
FIG. 12 illustrates a diagram of the basic components of a second embodiment of the intrusion detection system in accordance with the present invention (see also FIG. 17).
Figure 13:
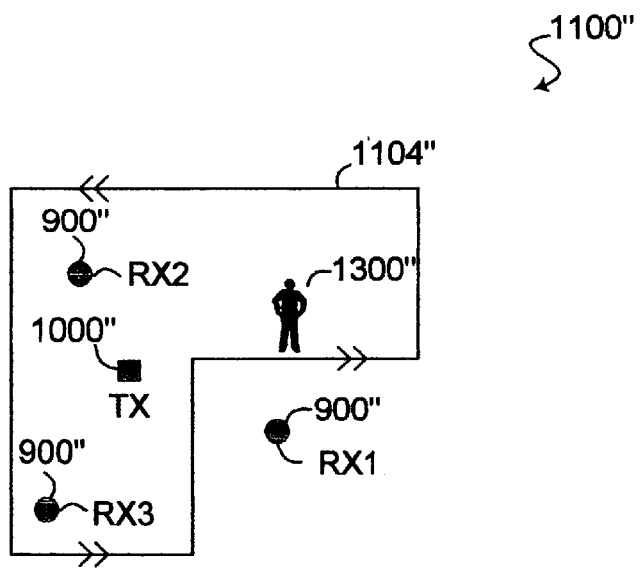
FIG. 13 illustrates an example of a specially shaped protection zone associated with a third embodiment in accordance with the present invention (see also FIG. 20).

Referring to FIG. 12, there is illustrated a block diagram of the basic components of the second embodiment of the intrusion detection system 1100'. The intrusion detection system 1100' extends the functionality of the intrusion detection system 1100 by implementing multiple UWB scanning receivers 900' (three shown) which can interact with the UWB transmitter 1000' to triangulate the current position of the intruder 1102'. Coordinating the measured target ranges of multiple UWB scanning receivers 900' can allow for precise positioning of the intruder 1102' via an intersection of the ranging ellipses of known distance of the intruder 1102' from each transmitter-receiver pair. This triangulation of the intruder 1102' is graphically shown in FIG. 12.

Empirical data has shown that the UWB scanning receivers 900' have sub-nanosecond time resolution, corresponding to ranging accuracy of less than 1 foot. The ranging ellipses of each individual transmitter/receiver are solved to determine the position of intruder 1102' via a numerical algorithm such as Newton-Raphson method or some other techniques.

Design the Shape of the Protection Zone (Third Embodiment)

The main difference between the second embodiment of the intrusion detection system 1100' and the third embodiment of the intrusion detection system 1100" is that the third embodiment enables the creation of an unusually shaped protection zone 1104" within the region that the target ellipses could converge due to an intrusion instead of using the elliptical zones shown in FIG. 12. Prior to arming the intrusion detection system 1100", the system can be put into a "learning mode". During the "learning mode", a person 1300" would traverse the perimeter of the protection zone 1104" to be protected and the intrusion detection system 1100" would track the person 1300" and build a two and possibly three-dimensional representation of the shape of the protection zone 1104" (see FIG. 13).

Detailed Description of First Embodiment

Figure 14:
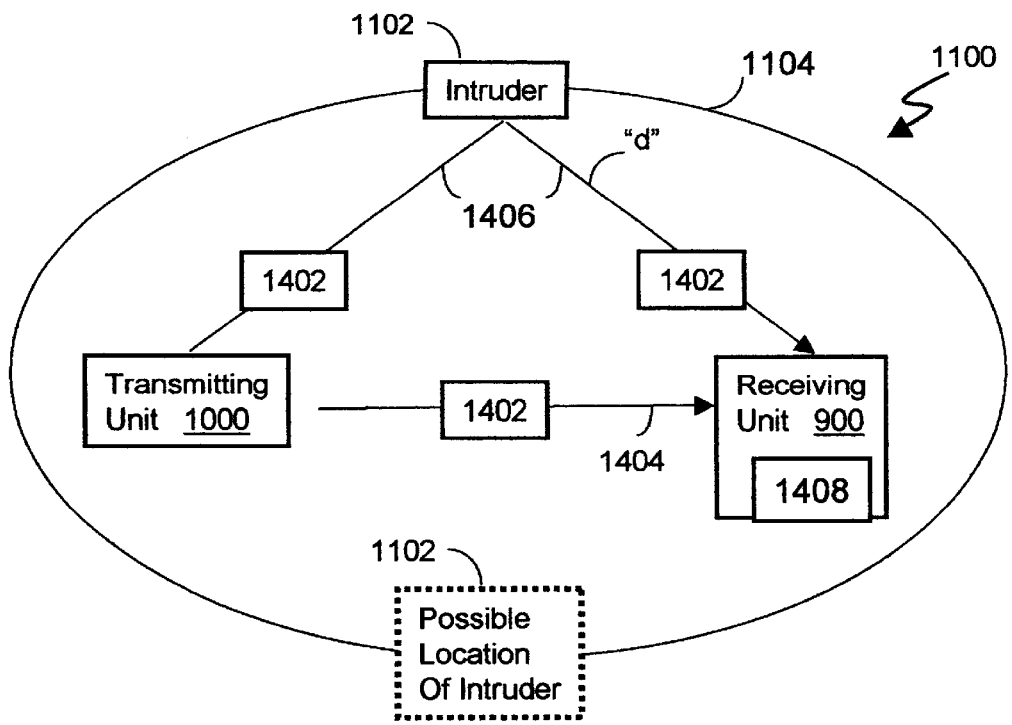
FIG. 14 illustrates in greater detail a diagram of the basic components of the first embodiment of the intrusion detection system in accordance with the present invention.

Referring to FIG. 14, there is a diagram illustrating the first embodiment of the intrusion detection system 1100 in accordance with the present invention. The intrusion detection system 1100 includes a transmitting impulse radio unit 1000 (described above as the UWB transmitter 1000) and a receiving impulse radio unit 900 (described above as the UWB scanning receiver 900). The transmitting impulse radio unit 1000 transmits an impulse radio signal 1402 having a known pseudorandom sequence of pulses that look like a series of Gaussian waveforms (see FIG. 1).

Figure 15A:
FIGS. 15a–15b illustrate an exemplary first waveform and an exemplary second waveform that could be generated by a receiving impulse radio unit shown in FIG. 14.

Initially, the impulse radio signal 1402 is transmitted within and through a protection zone 1104 that does not have an intruder 1102. The receiving impulse radio unit 900 receives the impulse radio signal 1402 and generates a first waveform 1502 (an exemplary first waveform is shown in FIG. 15a). The first waveform 1502 is a time domain representation of the actual distortion of the transmitted Gaussian waveform after being filtered by the environment around the transmitting impulse radio unit 1000 and the receiving impulse radio unit 900. In other words, the first waveform 1502 corresponds to the received impulse shape of the impulse radio signal 1402 that is received by the receiving impulse radio unit 900 when there is no intruder 1102 located in the protection zone 1104.

Figure 15B:
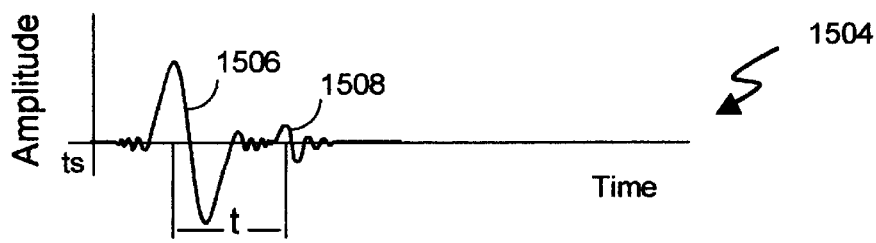

After the generation of the first waveform 1502, the receiving impulse radio unit 900 receives at a subsequent time "$t_s$" the impulse radio signal 1402 having a known pseudorandom sequence of pulses that are similar to the pulses initially transmitted by the transmitting impulse radio unit 1000 during the generation of the first waveform 1502. However at this time, the impulse radio signal 1402 is transmitted within and through a protection zone 1104 that does have an intruder 1102. In particular, the receiving impulse radio unit 900 receives the impulse radio signal 1402 that passed over a direct path 1404 between the transmitting impulse radio unit 1000 and the receiving impulse radio unit 900. The presence of the intruder 1102 causes the receiving impulse radio unit 900 to also receive the impulse radio signal 1402 that passed over an indirect path 1406 between the transmitting impulse radio unit 1000 and the receiving impulse radio unit 900. The receiving impulse radio unit 900 receives both of these impulse radio signals 1402 in addition to other reflected impulse radio signals 1402 (not shown) over time and generates a second waveform 1504 (an exemplary second waveform 1504 is shown in FIG. 15b). The second waveform 1504 is a time domain representation of the actual distortion of the transmitted Gaussian waveforms after being bounced of the intruder 1102 and filtered by the environment around the transmitting impulse radio unit 1000 and the receiving impulse radio unit 900. In other words, the second waveform 1504 corresponds to the received impulse shapes of the impulse radio signals 1402 that are received by the receiving impulse radio unit 900 when the intruder 1102 is located in the protection zone 1104.

The receiving impulse radio unit 900 includes a processor 1408 that compares the first waveform 1502 and the second waveform 1504 to determine whether there is a change between the first waveform 1502 and the second waveform 1504 caused by an intruder 1102 entering the protection zone 1104. To illustrate this change between waveforms reference is made to FIGS. 15a and 15b, where there are illustrated two exemplary waveforms 1502 and 1504 that could be generated by the receiving impulse radio unit 900. The first waveform 1502 has an initial wavefront 1503 representative of the first received impulse radio pulses of the impulse radio signal 1402. Likewise, the second waveform 1504 generated after the first waveform 1502 has an initial wavefront 1506 representative of the first received impulse radio pulse of the subsequently received impulse radio signal 1402. In addition, the second waveform 1504 has a multipath reflection part 1508 caused by the intruder 1102 that was absent in the first waveform 1502 but present in the second waveform 1504. This multipath reflection part 1508 is caused by the reception of the impulse radio signal 1402 that bounced off the intruder 1102 and passed over the indirect path 1406 between the transmitting impulse radio unit 1000 and the receiving impulse radio unit 900. The distance "d" between the intruder 1102 and the receiving impulse radio unit 900 can be calculated knowing the elapsed time "t" between the initial wavefront 1506 and the multipath reflection part 1508 of the second waveform 1504. Once the distance "d" is calculated, the intruder 1102 could be in one of many places indicated by the ellipse shown in FIG. 14 (shown are two possible positions of the intruder 1102).

It should be understood that there may be many items (e.g., walls, trees, furniture . . . ) within the protection zone 1104 that could cause a multipath reflection part in the first and second waveforms 1502 and 1504 but it is the difference between the two waveforms 1502 and 1504 that indicates the presence of one or more intruders 1102. Moreover, it should be noted that the shape of the protection zone 1104 in the first embodiment is basically arbitrary as compared to the specially designed shape of the protection zone 1104" in the third embodiment.

Figure 16:
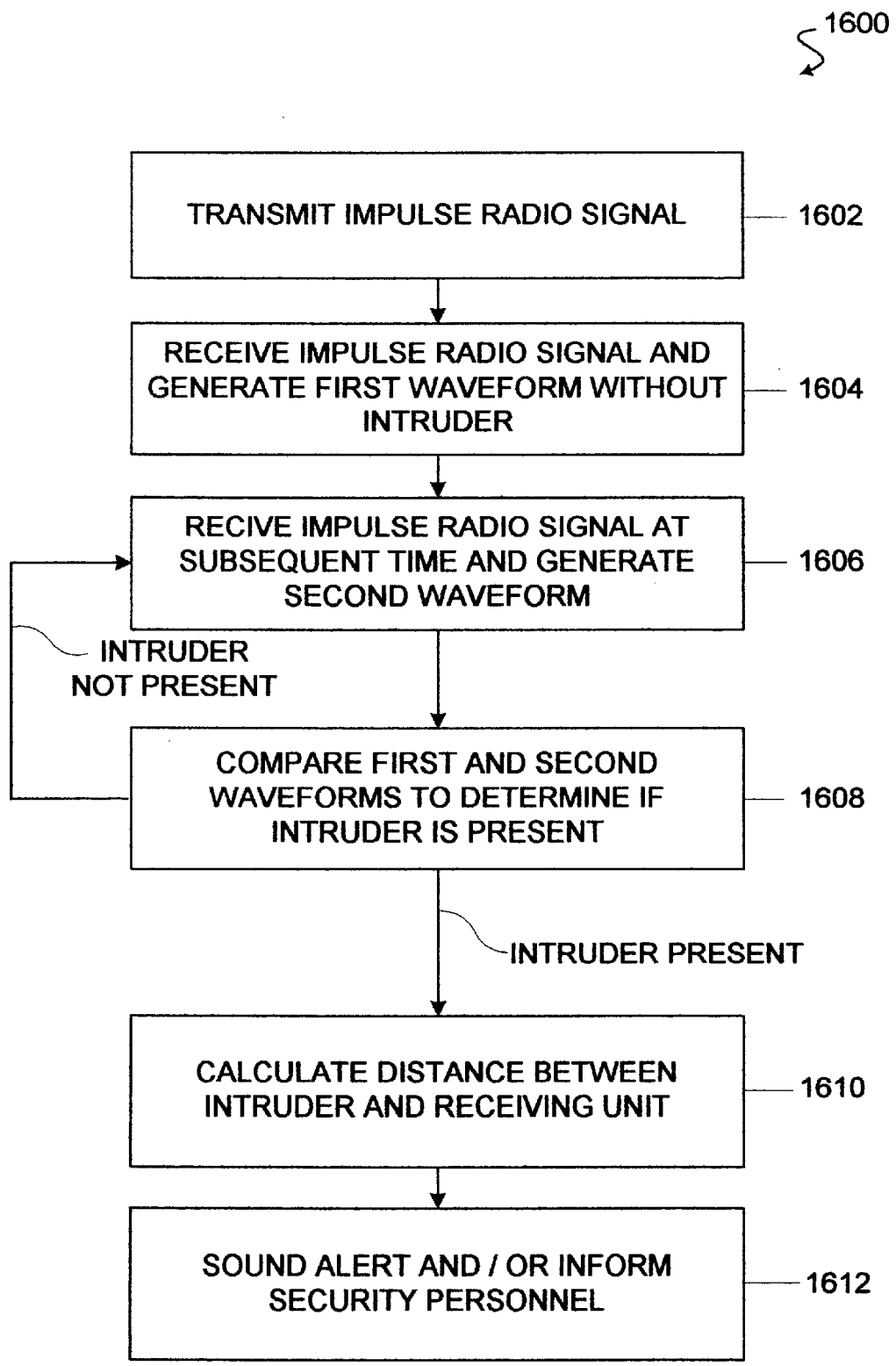
FIG. 16 illustrates a flowchart of the basic steps of a first embodiment of the preferred method in accordance with the present invention.

Referring to FIG. 16, there is a flowchart illustrating the basic steps of a first embodiment of the preferred method 1600 of the present invention. Beginning at step 1602, the transmitting impulse radio unit 1000 operates to transmit the impulse radio signal 1402. At this time, the impulse radio signal 1402 is made up of impulse radio pulses that are transmitted within and through a protection zone 1104 that does not have an intruder 1102. A more detailed discussion about the transmitting impulse radio unit 1000 has been provided above with respect to FIG. 10.

At step 1604, the receiving impulse radio unit 900 operates to receive the impulse radio signal 1402 and generate the first waveform 1502. Again, the receiving impulse radio unit 900 receives the impulse radio signal 1402 and generates a first waveform 1502 (see FIG. 15a) that is a time domain representation of the actual distortion of the transmitted Gaussian waveform after being filtered by the environment around the transmitting impulse radio unit 1000 and the receiving impulse radio unit 900. In other words, the first waveform 1502 corresponds to the received impulse shape of the impulse radio signal 1402 that is received by the receiving impulse radio unit 900 when there is no intruder 1102 located in the protection zone 1104. A more detailed discussion about the receiving impulse radio unit 1000 has been provided above with respect to FIG. 9.

At step 1606 and at a subsequent time with respect to steps 1602 and 1604, the receiving impulse radio unit 900 operates to receive the impulse radio signal 1402 and generate the second waveform 1504. In the present example, the second waveform 1504 (see FIG. 15b) illustrates what the impulse radio signals 1402 received by the receiving impulse radio unit 900 looks like in the time domain with an intruder 1102 located in the protection zone 1104. In other words, the second waveform 1504 corresponds to the received impulse shape of the impulse radio signals 1402 that are received by the receiving impulse radio unit 900 over the direct path 1404 and the indirect path 1406 when the intruder 1102 is located in the protection zone 1104.

At step 1608, the processor 1408 within the receiving impulse radio unit 900 operates to compare the first waveform 1502 and the second waveform 1504 to determine whether there is a change between the first waveform 1502 and the second waveform 1504 caused by an intruder 1102 entering the protection zone 1104. In the present example, there is a change between the first waveform 1502 and the second waveform 1504 because an intruder 1102 was not present when the first waveform 1502 was generated but the intruder 1102 was present when the second waveform 1504 was generated by the receiving impulse radio unit 900 (see FIGS. 15a–15b). This change is noticeable due to the presence of the multipath reflection part 1508 caused by the intruder 1102. Of course, the receiving impulse radio unit 900 may generate many second waveforms in which there is no difference or very little difference with a first waveform because an intruder 1102 was not present. If an intruder 1102 is not present in the protection zone 1104 then the method 1600 returns to and repeats steps 1606 and 1608 until an intruder 1102 is determined to be present in the protection zone 1104.

At step 1610, if the intruder 1102 is determined to be in the protection zone 1104, the processor 1408 could then calculate the difference "d" between the direct path between the transmitter 1000 and receiver 900 and the indirect path 1402 by knowing the elapsed time "t" between the initial wavefront 1506 and the multipath reflection part 1508 of the second waveform 1504 (see FIG. 15b). For instance, the distance "d" can be calculated to be 0.984 feet for each nanosecond in the elapsed time "t" between the initial wavefront 1506 and the multipath reflection part 1508 of the second waveform 1504 (see FIG. 15b). In this embodiment, the intruder 1102 could be in one of many places indicated by the ellipse shown in FIG. 14 (shown are two possible positions of the intruder 1102). Reference is made to the second embodiment of the intrusion detection system 1100' which can determine the real location of the intruder 1102.

At step 1612, the receiving impulse radio unit 900 sounds an alarm and/or informs remote security personnel when there is an intruder 1102 present in the protection zone 1104. For extra security, the receiving impulse radio unit 900 can use impulse radio technology to alert the remote security personnel.

Detailed Description of Second Embodiment

Figure 17:
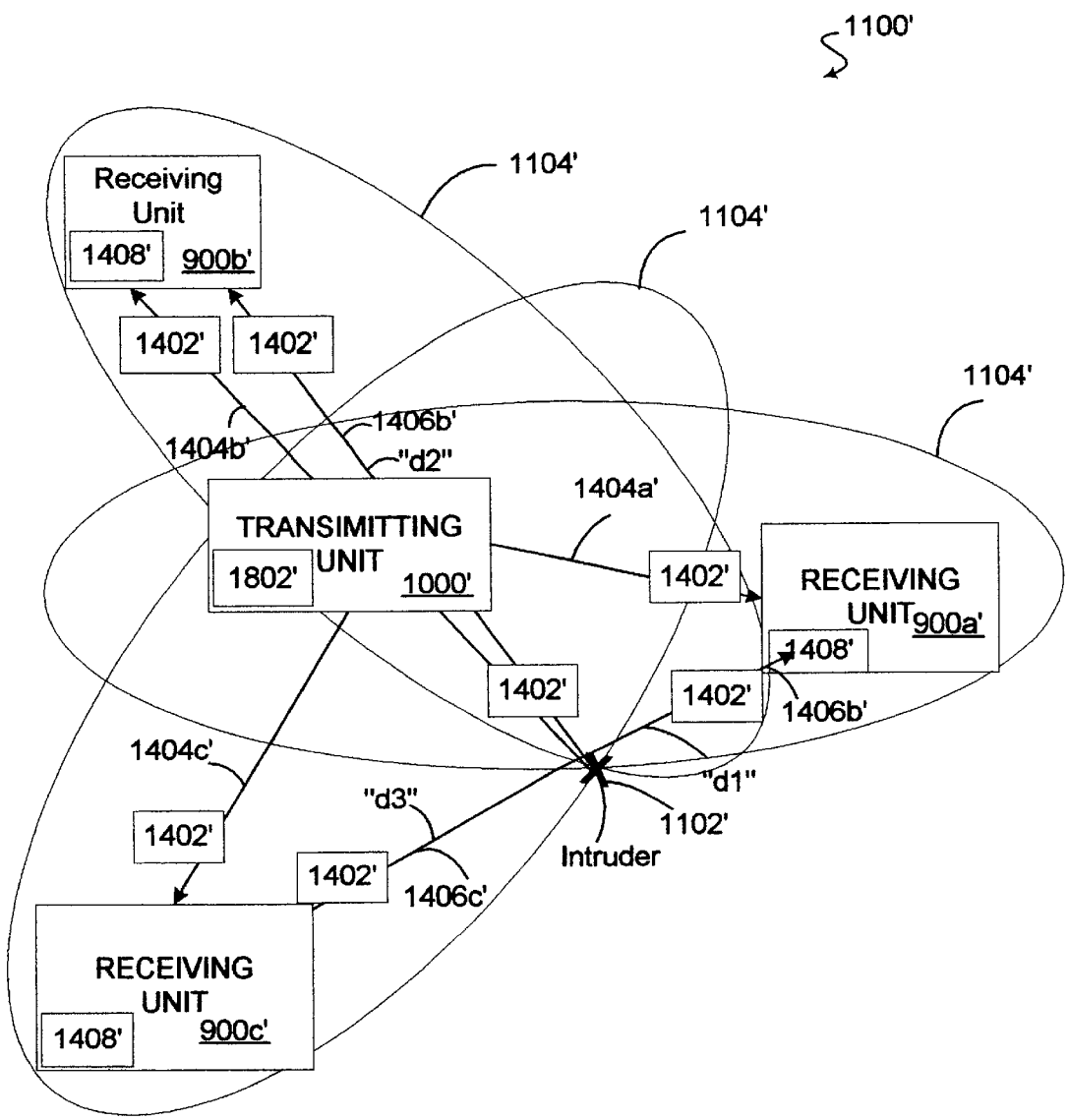
FIG. 17 illustrates in greater detail a diagram of the basic components of a second embodiment of the intrusion detection system in accordance with the present invention.

Referring to FIG. 17, there is a diagram illustrating a second embodiment of the intrusion detection system 1100 in accordance with the present invention. The second embodiment of the intrusion detection system 1000 is illustrated using prime referenced numbers. Basically, the intrusion detection system 1000' is the same as the first embodiment except that at least three receiving impulse radio units 900a', 900b' and 900c' are used to enable a current position of the intruder 1102' to be triangulated and determined within the protection zone 1104'. Each of the three receiving impulse radio units 900a', 900b' and 900c' operate in a similar manner as the receiving impulse radio unit 900 of the first embodiment.

The intrusion detection system 1100' includes a transmitting impulse radio unit 1000' and at least three receiving impulse radio units 900a', 900b' and 900c'. The transmitting impulse radio unit 1000' transmits an impulse radio signal 1402' having a known pseudorandom sequence of pulses that look like a series of Gaussian waveforms (see FIG. 1). Initially, the impulse radio signal 1402' is transmitted within and through a protection zone 1104' that does not have an intruder 1102'.

Figure 18A:
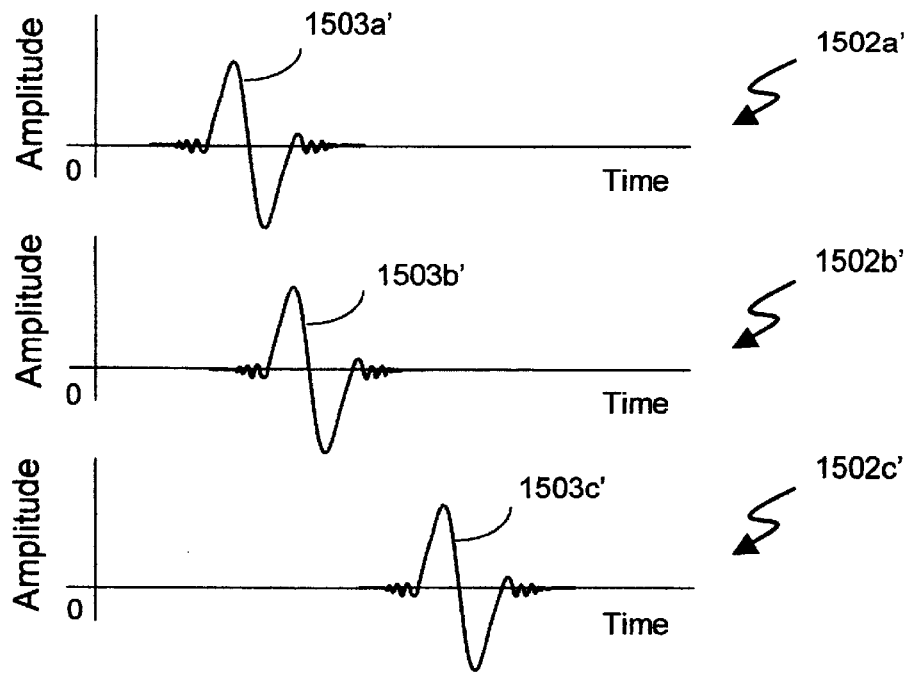
FIGS. 18a–18b illustrate exemplary first waveforms and exemplary second waveforms that could be generated by three different receiving impulse radio units shown in FIG. 17.

Each receiving impulse radio unit 900a', 900b' and 900c' respectively receives the first impulse radio signal 1402' and generates a first waveform 1502a', 1502b' and 1502c' (see FIG. 18a). The first waveform 1502a', 1502b' and 1502c' is a time domain representation of the actual distortion of the transmitted Gaussian waveform after being filtered by the environment around the transmitting impulse radio unit 1000' and each receiving impulse radio unit 900a', 900b' and 900c'. In other words, each first waveform 1502a', 1502b' and 1502c' corresponds to the received impulse shape of the impulse radio signal 1402' that is received by the receiving impulse radio units 900a', 900b' and 900c' when there is no intruder 1102' located in the protection zone 1104'.

After the generation of the first waveforms 1502a', 1502b' and 1502c', each receiving impulse radio unit 900a', 900b' and 900c' receives at a subsequent time "$t_s$" the impulse radio signal 1402' having a known pseudorandom sequence of pulses that are similar to the pulses initially transmitted by the transmitting impulse radio unit 1000' during the generation of the first waveforms 1502a', 1502b' and 1502c'. However at this time, the impulse radio signal 1402' is transmitted within and through a protection zone 1104' that does have an intruder 1102'.

In particular, each receiving impulse radio unit 900a', 900b' and 900c' respectively receives the impulse radio signal 1402' that passed over a direct path 1404a', 1404b' and 1404c' between the transmitting impulse radio unit 1000' and the receiving impulse radio units 900a', 900b' and 900c'. The presence of the intruder 1102' causes each receiving impulse radio unit 900a', 900b' and 900c' to also respectively receive the impulse radio signal 1402' that passed over an indirect path 1406a', 1406b' and 1406c' between the transmitting impulse radio unit 1000' and the receiving impulse radio units 900a', 900b' and 900c'. Each receiving impulse radio unit 900a', 900b' and 900c' receives both of these impulse radio signals 1402' in addition to other reflected impulse radio signals 1402' (not shown) over time and generates a second waveform 1504a', 1504b' and 1504c' (see FIG. 18b). Each second waveform 1504a', 1504b' and 1504c' is a time domain representation of the actual distortion of the transmitted Gaussian waveforms after being bounced of the intruder 1102' and filtered by the environment around the transmitting impulse radio unit 1000' and the receiving impulse radio units 900a', 900b' and 900c'. In other words, the second waveforms 1504a', 1504b' and 1504' each correspond to the received impulse shapes of the impulse radio signals 1402' that are received by each receiving impulse radio unit 900a', 900b' and 900c' when the intruder 1102' is located in the protection zone 1104'.

Each of the receiving impulse radio units 900a', 900b' and 900c' includes a processor 1408' that respectively compares the first waveform 1502a', 1502b' and 1502c' and the second waveform 1504a', 1504b' and 1504c' to determine whether there is a change between the first waveform 1502a', 1502b' and 1502c' and the second waveform 1504a', 1504b' and 1504c' caused by an intruder 1102' entering the protection zone 1104'. To illustrate this change between waveforms reference is made to FIGS. 18a and 18b, where there are respectively illustrated exemplary first waveforms 1502a', 1502b', 1502c' and exemplary second waveforms 1504a', 1504b' and 1504c' that could be generated by the receiving impulse radio units 900a', 900b' and 900c'. For instance, the receiving impulse radio unit 900a' would generate the first waveform 1502a' and the second waveform 1504a'. Each first waveform 1502a', 1502b' and 1502c' has an initial wavefront 1503a', 1503b' and 1503c' representative of the first received impulse radio pulses of the impulse radio signal 1402'. Likewise, each second waveform 1504a', 1504b' and 1504c' has an initial wavefront 1506a', 1506b' and 1506c' representative of the first received impulse radio pulses in the subsequently received impulse radio signal 1402'. In addition, the second waveforms 1504a', 1504b' and 1504c' each have a multipath reflection part 1508a', 1508b' and 1508c' caused by the intruder 1102' that was absent in the first waveforms 1502a', 1502b' and 1502c' but present in the second waveforms 1504a', 1504b' and 1504c'. These multipath reflection parts 1508a', 1508b' and 1508c' are caused by the reception of the impulse radio signals 1402' that bounced off the intruder 1102' and passed over the indirect path 1406a', 1406b' and 1406c' between the transmitting impulse radio unit 1000 and the receiving impulse radio units 900a', 900b' and 900c'. The distances "d1", "d2" and "d3" which are the differences between the direct paths 1402' and indirect paths 1406a', 1406b' and 1406c' can be calculated knowing the elapsed time "t1", "t2" and "t3" between the initial wavefront 1506a', 1506b' and 1506c' and the multipath reflection part 1508a', 1508b' and 1508c' of the second waveforms 1504a', 1504b' and 1504c'.

Again it should be understood that there may be many items (e.g., walls, trees, furniture . . . ) within the protection zone 1104' that could cause a multipath reflection part in the first waveform 1502a', 1502b' and 1502c' and the second waveform 1504a', 1504b' and 1504c' but it is the difference between the two waveforms that indicates the presence of one or more intruders 1102'. Moreover, it should be noted that the shape of the protection zone 1104' in this embodiment is basically arbitrary as compared to the specially designed shape of the protection zone 1104" the third embodiment.

After calculating the distances "d1", "d2" and "d3" which are the differences between the direct paths 1402' and indirect paths 1406a', 1406b' and 1406c', each receiving impulse radio unit 900a', 900b' and 900c' and transmitting unit 1000' forwards their calculated distance "d1", "d2" or "d3" to the transmitting impulse radio unit 1000'. Thereafter, the transmitting impulse radio unit 1000' has a processor 1802' that use the distances "d1", "d2" and "d3", and the known positions of the receiving impulse radio units 900a', 900b' and 900c' to calculate the location of the intruder 1102' within the protection zone 1104'. Again, the position of intruder 1102' can be determined by the processor 1802' using a numerical algorithm such as Newton-Raphson method or some other techniques. Once the position and coordinates of the intruder 1102' are determined, various filtering techniques (e.g., Kalman filter) can be used by the intrusion detection system 1100' to track the movement of the intruder 1102' within the protection zone 1104'.

It should be understood that two receiving impulse radio units 900a' and 900b' could be used to calculate the position of the intruder 1102' within the protection zone 1104'. This is possible in the situation where one of the three receiving impulse radio units 900a', 900b' or 900c' can be eliminated if a part of the protection zone 1104' is not required to be scanned and as such true triangulation of the position of the intruder 1102' need not be performed.

Figure 19A:
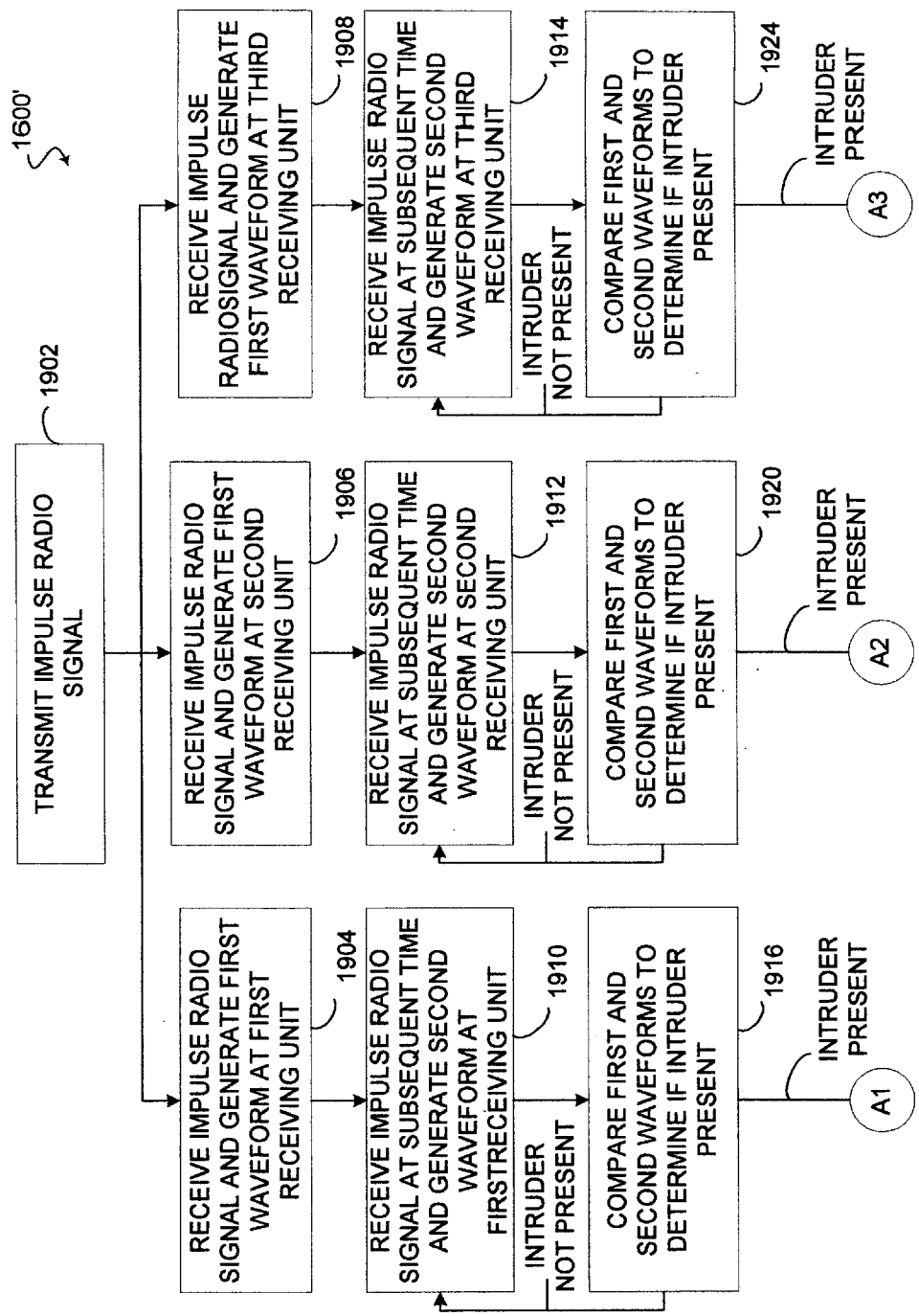
FIGS. 19a–19b illustrates a flowchart of the basic steps of a second embodiment of the preferred method in accordance with the present invention.
Figure 19B:
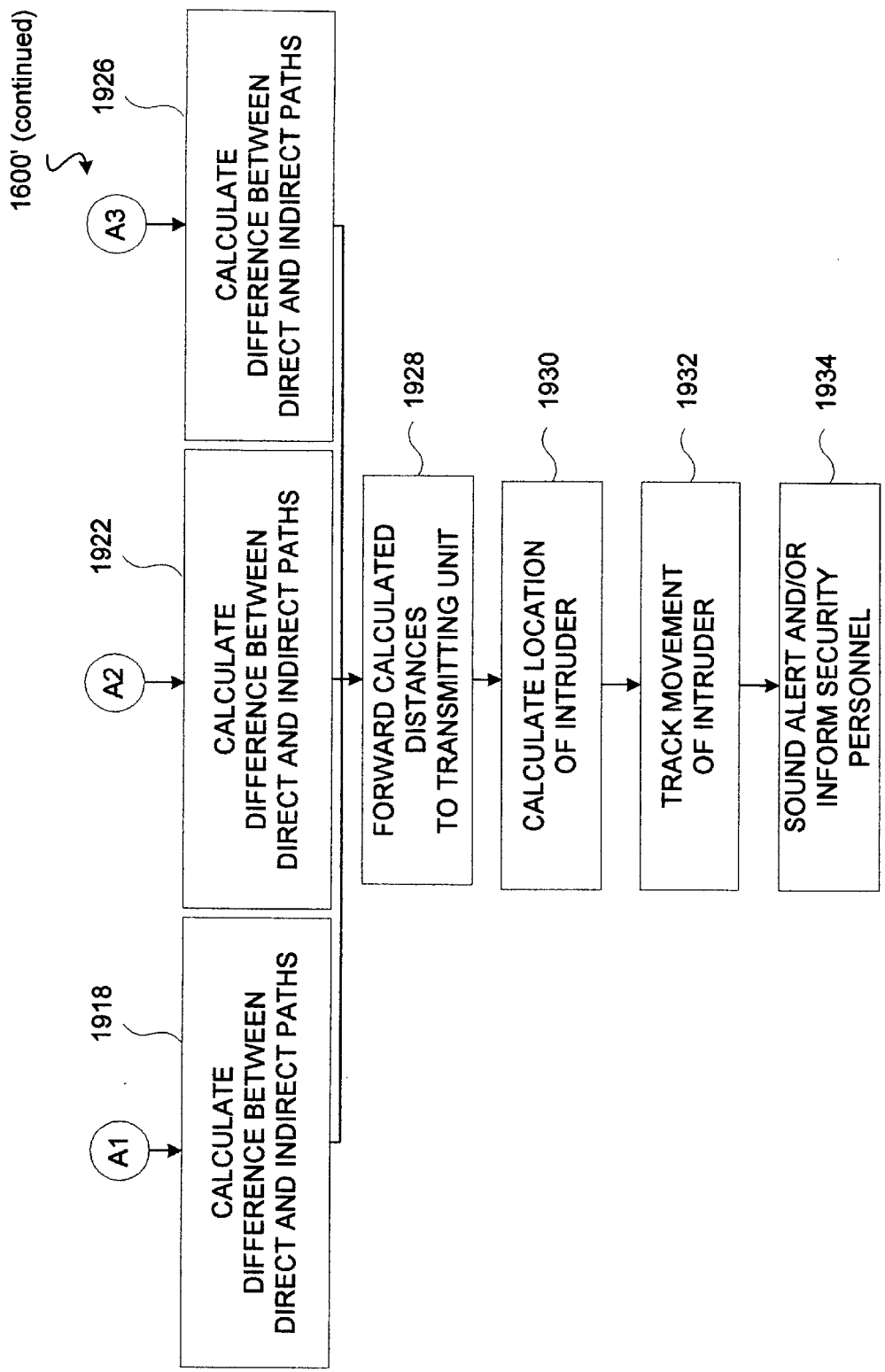

Referring to FIGS. 19a–19b, there is a flowchart illustrating the basic steps of a second embodiment of the preferred method 1600' of the present invention. Beginning at step 1902, the transmitting impulse radio unit 1000' operates to transmit the impulse radio signal 1402'. At this time, the impulse radio signal 1402' is made up of impulse radio pulses that are transmitted within and through a protection zone 1104' that does not have an intruder 1102'.

At step 1904, the first receiving impulse radio unit 900a' operates to receive the impulse radio signal 1402' and generate the first waveform 1502a'. Again, the first receiving impulse radio unit 900a' receives the impulse radio signal 1402' and generates a first waveform 1502a' (see FIG. 18a) that is a time domain representation of the actual distortion of the transmitted Gaussian waveform after being filtered by the environment around the transmitting impulse radio unit 1000' and the receiving impulse radio units 900a', 900b' and 900c'. At this time, the first waveform 1502a' corresponds to the received impulse shape of the impulse radio signal 1402' that is received by the first receiving impulse radio unit 900a' when there is no intruder 1102' located in the protection zone 1104'.

At step 1906, the second receiving impulse radio unit 900b' operates to receive the impulse radio signal 1402' and generate the first waveform 1502b'. Again, the second receiving impulse radio unit 900b' receives the impulse radio signal 1402' and generates a first waveform 1502b' (see FIG. 18a) that is a time domain representation of the actual distortion of the transmitted Gaussian waveform after being filtered by the environment around the transmitting impulse radio unit 1000' and the receiving impulse radio units 900a', 900b' and 900c'. At this time, the first waveform 1502b' corresponds to the received impulse shape of the impulse radio signal 1402' that is received by the second receiving impulse radio unit 900b' when there is no intruder 1102' located in the protection zone 1104'.

At step 1908, the third receiving impulse radio unit 900c' operates to receive the impulse radio signal 1402' and generate the first waveform 1502c'. Again, the third receiving impulse radio unit 900c' receives the impulse radio signal 1402' and generates a first waveform 1502c' (see FIG. 18a) that is a time domain representation of the actual distortion of the transmitted Gaussian waveform after being filtered by the environment around the transmitting impulse radio unit 1000' and the receiving impulse radio units 900a', 900b' and 900c'. At this time, the first waveform 1502c' corresponds to the received impulse shape of the impulse radio signal 1402' that is received by the third receiving impulse radio unit 900c' when there is no intruder 1102' located in the protection zone 1104'. It should be understood that steps 1904, 1906 and 1908 can take place in any order depending on the locations of the receiving impulse radio units 900a', 900b' and 900c' with respect to the location of the transmitting impulse radio unit 1000'.

At step 1910 and at a subsequent time with respect to step 1904, the first receiving impulse radio unit 900a' operates to receive the impulse radio signal 1402' and generate the second waveform 1504a'. In the present example, the second waveform 1504a' (see FIG. 18b) illustrates what the impulse radio signals 1402' received by the first receiving impulse radio unit 900a' looks like in the time domain with an intruder 1102' located in the protection zone 1104'. In other words, the second waveform 1502a' corresponds to the received impulse shape of the impulse radio signals 1402' that are received by the first receiving impulse radio unit 900a' over the direct path 1404a' and the indirect path 1406a' when the intruder 1102' is located in the protection zone 1104'.

At step 1912 and at a subsequent time with respect to step 1908, the second receiving impulse radio unit 900b' operates to receive the impulse radio signal 1402' and generate the second waveform 1504b'. In the present example, the second waveform 1504b' (see FIG. 18b) illustrates what the impulse radio signals 1402' received by the second receiving impulse radio unit 900b' looks like in the time domain with an intruder 1102' located in the protection zone 1104'. In other words, the second waveform 1502b' corresponds to the received impulse shape of the impulse radio signals 1402' that are received by the second receiving impulse radio unit 900b' over the direct path 1404b' and the indirect path 1406b' when the intruder 1102' is located in the protection zone 1104'.

At step 1914 and at a subsequent time with respect to step 2008, the third receiving impulse radio unit 900c' operates to receive the impulse radio signal 1402' and generate the second waveform 1504c'. In the present example, the second waveform 1504c' (see FIG. 18b) illustrates what the impulse radio signals 1402' received by the third receiving impulse radio unit 900c' looks like in the time domain with an intruder 1102' located in the protection zone 1104'. In other words, the second waveform 1502c' corresponds to the received impulse shape of the impulse radio signals 1402' that are received by the third receiving impulse radio unit 900c' over the direct path 1404c' and the indirect path 1406c' when the intruder 1102' is located in the protection zone 1104'. It should be understood that steps 1910, 1912 and 1914 can take place in any order depending on the locations of the receiving impulse radio units 900a', 900b' and 900c' with respect to the location of the transmitting impulse radio unit 1000'.

At step 1916, the processor 1408a' within the first receiving impulse radio unit 900a' operates to compare the first waveform 1502a' and the second waveform 1504a' to determine whether there is a change between the first waveform 1502a' and the second waveform 1504a' caused by an intruder 1102' entering the protection zone 1104'. In the present example, there is a change between the first waveform 1502a' and the second waveform 1504a' because an intruder 1102' was not present when the first waveform 1502a' was generated but the intruder 1102' was present when the second waveform 1504a' was generated by the first receiving impulse radio unit 900a' (see FIGS. 18a–18b). This change is noticeable due to the presence of the multipath reflection part 1508a' caused by the intruder 1102'. Of course, the first receiving impulse radio unit 900a' may generate many second waveforms at step 1910 in which there is no difference or very little difference with a first waveform because an intruder 1102' was not present. If an intruder 1102' is not present in the protection zone 1104' then the method 1600' returns to and repeats steps 1910 and 1916 until an intruder 1102' is determined to be present in the protection zone 1104'.

Figure 18B:
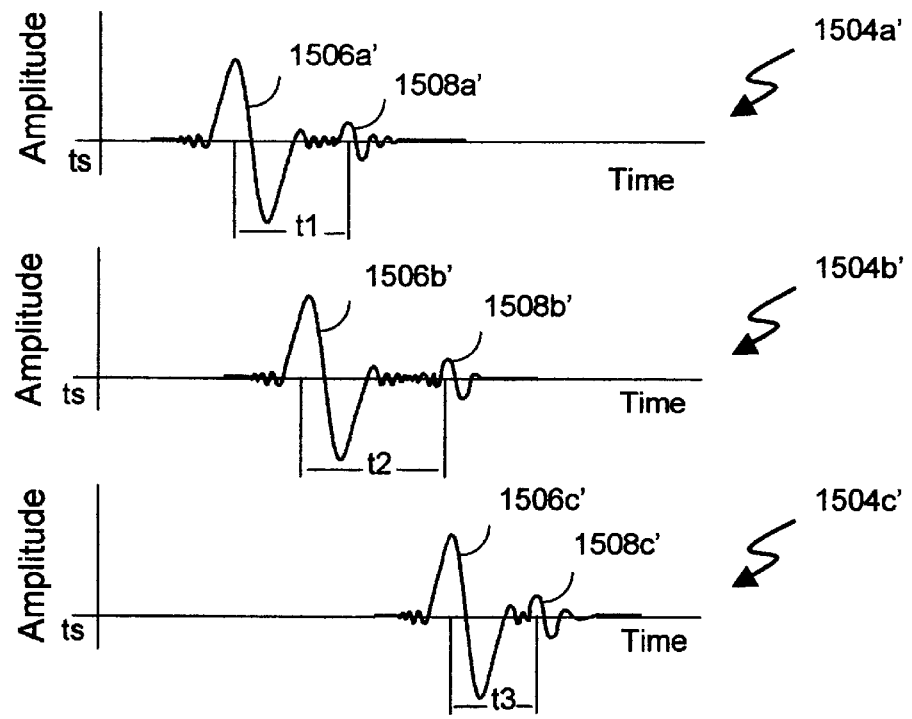

At step 1918, if the intruder 1102' is determined to be in the protection zone 1104', the processor 1408a' could then calculate the distance "d1" between direct and indirect paths by knowing the elapsed time "t1" between the initial wavefront 1506a' and the multipath reflection part 1508a' of the second waveform 1504a' (see FIG. 18b). For instance, the distance "d1" can be calculated to be 0.984 feet for each nanosecond in the elapsed time "t1" between the initial wavefront 1506a' and the multipath reflection part 1508a' of the second waveform 1504a'(see FIG. 18b).

At step 1920, the processor 1408b' within the second receiving impulse radio unit 900b' operates to compare the first waveform 1502b' and the second waveform 1504b' to determine whether there is a change between the first waveform 1502b' and the second waveform 1504b' caused by an intruder 1102' entering the protection zone 1104'. In the present example, there is a change between the first waveform 1502b' and the second waveform 1504b' because an intruder 1102' was not present when the first waveform 1502b' was generated but the intruder 1102' was present when the second waveform 1504b' was generated by the second receiving impulse radio unit 900b' (see FIGS. 18a–18b). This change is noticeable due to the presence of the multipath reflection part 1508b' caused by the intruder 1102'. Of course, the second receiving impulse radio unit 900b' may generate many second waveforms at step 1912 in which there is no difference or very little difference with a first waveform because an intruder 1102' was not present. If an intruder 1102' is not present in the protection zone 1104' then the method 1600' returns to and repeats steps 1912 and 1920 until an intruder 1102' is determined to be present in the protection zone 1104'.

At step 1922, if the intruder 1102' is determined to be in the protection zone 1104', the processor 1408b' could then calculate the distance "d2" between direct and indirect paths by knowing the elapsed time "t2" between the initial wavefront 1506b' and the multipath reflection part 1508b' of the second waveform 1504b' (see FIG. 18b). For instance, the distance "d2" can be calculated to be 0.984 feet for each nanosecond in the elapsed time "t2" between the initial wavefront 1506b' and the multipath reflection part 1508b' of the second waveform 1504b' (see FIG. 18b).

At step 1924, the processor 1408c' within the third receiving impulse radio unit 900c' operates to compare the first waveform 1502c' and the second waveform 1504c' to determine whether there is a change between the first waveform 1502c' and the second waveform 1504c' caused by an intruder 1102' entering the protection zone 1104'. In the present example, there is a change between the first waveform 1502c' and the second waveform 1504c' because an intruder 1102' was not present when the first waveform 1502c' was generated but the intruder 1102' was present when the second waveform 1504c' was generated by the third receiving impulse radio unit 900c' (see FIGS. 18a–18b). This change is noticeable due to the presence of the multipath reflection part 1508c' caused by the intruder 1102'. Of course, the third receiving impulse radio unit 900c' may generate many second waveforms at step 1914 in which there is no difference or very little difference with a first waveform because an intruder 1102' was not present. If an intruder 1102' is not present in the protection zone 1104' then the method 1600' returns to and repeats steps 1914 and 1924 until an intruder 1102' is determined to be present in the protection zone 1104'.

At step 1926, if the intruder 1102' is determined to be in the protection zone 1104', the processor 1408c' could then calculate the distance "d3" between direct and indirect paths by knowing the elapsed time "t3" between the initial wavefront 1506c' and the multipath reflection part 1508c' of the second waveform 1504c' (see FIG. 18b). For instance, the distance "d3" can be calculated to be 0.984 feet for each nanosecond in the elapsed time "t3" between the initial wavefront 1506c' and the multipath reflection part 1508c' of the second waveform 1504c' (see FIG. 18b).

At step 1928, after calculating the distances "d1", "d2" and "d3" between each receiving impulse radio unit 900a', 900b' and 900c' and the intruder 1102', each receiving impulse radio unit 900a', 900b' and 900c' forwards their calculated distance "d1", "d2" or "d3" to the transmitting impulse radio unit 1000'.

At step 1930, the transmitting impulse radio unit 1000' has a processor 1802' that use the distances "d1", "d2" and "d3" and the known positions of the receiving impulse radio units 900a', 900b' and 900c' to calculate the location of the intruder 1102' within the protection zone 1104'. Again, the position of intruder 1102' can be determined by the processor 1802' using a numerical algorithm such as Newton-Raphson method or some other techniques.

At step 1932, once the position and coordinates of the intruder 1102' are determined at step 1932, then various filtering techniques (e.g., Kalman filter) can be used by the intrusion detection system 1100' to track the movement of the intruder 1102' within the protection zone 1104'.

At step 1934, the intrusion detection system 1100' sounds an alarm and/or informs remote security personnel when there is an intruder 1102' present in the protection zone 1104'. For extra security, the intrusion detection system 1100' can use impulse radio technology to alert the remote security personnel.

Detailed Description of Third Embodiment

Figure 20:
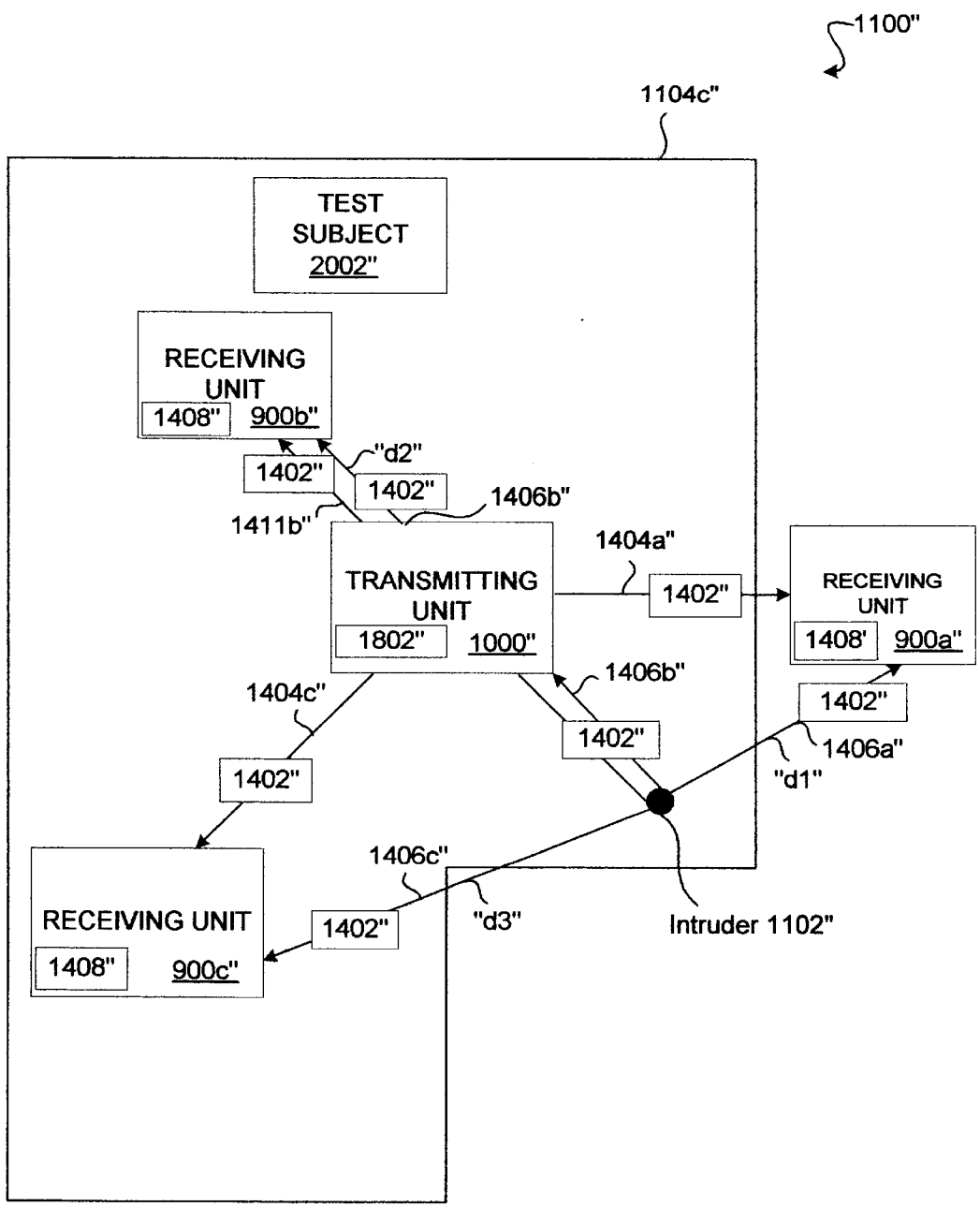
FIG. 20 illustrates in greater detail a diagram of the basic components of a third embodiment of the intrusion detection system in accordance with the present invention.

Referring to FIG. 20, there is a diagram illustrating a third embodiment of the intrusion detection system 1100 in accordance with the present invention. The third embodiment of the intrusion detection system 1100 is illustrated using double prime referenced numbers. Basically, the intrusion detection system 1100" is similar to the second embodiment except that prior to detecting any intruders 1102" the intrusion detection system 1100" can utilize a test subject 2002" and impulse radio technology to design the shape of the protection zone 1104". In other words, the intrusion detection system 1100" enables the creation of an unusually shaped protection zone 1104c" instead of using the arbitrary shapes associated with the protection zones 1104 and 1104' of the first two embodiments. Prior to arming the intrusion detection system 1100', the system can be put into a "learning mode". During the "learning mode", the test subject 2002" traverses the perimeter 2204" of the protection zone 1104c" to be protected and the intrusion detection system 1100" would track the test subject 2002" and build a two and possibly three-dimensional representation of the shape of the protection zone 1104c".The intrusion detection system 1100" can track the test subject 2002" in the same manner the intrusion detection system 1100' would track an intruder 1104' in the second embodiment.

Like the second embodiment, the intrusion detection system 1100" includes a transmitting impulse radio unit 1000" and at least three receiving impulse radio units 900a", 900b" and 900c". The transmitting impulse radio unit 1000" transmits an impulse radio signal 1402" having a known pseudorandom sequence of pulses that look like a series of Gaussian waveforms (see FIG. 1). Initially, the impulse radio signal 1402" is transmitted within and through an area including the protection zone 1104c" that does not have an intruder 1102".

Each receiving impulse radio unit 900a", 900b" and 900c" receives the first impulse radio signal 1402" and generates a first waveform 1502a", 1502b" and 1502c" (similar to the first waveforms 1502a', 1502b' and 1502c' shown in FIG. 18a). Each of the first waveforms 1502a", 1502b" and 1502c" is a time domain representation of the actual distortion of the transmitted Gaussian waveform after being filtered by the environment around the transmitting impulse radio unit 1000" and each receiving impulse radio unit 900a", 900b" and 900c". In other words, each first waveform 1502a", 1502b" and 1502c" corresponds to the received impulse shape of the impulse radio signal 1402" that is received by each receiving impulse radio unit 900a", 900b" and 900c" when there is no intruder 1102" located in or near the protection zone 1104c".

After the generation of the first waveforms 1502a", 1502b" and 1502c", each receiving impulse radio unit 900a", 900b" and 900c" receives at a subsequent time "$t_s$" the impulse radio signal 1402" having a known pseudorandom sequence of pulses that are similar to the pulses initially transmitted by the transmitting impulse radio unit 1000" during the generation of the first waveforms 1502a", 1502b" and 1502c". However at this time, the impulse radio signal 1402" is transmitted within and through a protection zone 1104c" that does have an intruder 1102" in or near it.

In particular, each receiving impulse radio unit 900a", 900b" and 900c" respectively receives the impulse radio signal 1402" that passed over a direct path 1404a", 1404b" and 1404c" between the transmitting impulse radio unit 1000" and the receiving impulse radio unit 900a", 900b" and 900c". The presence of the intruder 1102" causes each receiving impulse radio unit 900a", 900b" and 900c" to also respectively receive the impulse radio signal 1402" that passed over an indirect path 1406a", 1406b" and 1406c" from the transmitting impulse radio unit 1000" to the receiving impulse radio unit 900a", 900b" and 900c". Each receiving impulse radio unit 900a", 900b" and 900c" receives both of these impulse radio signals 1402" in addition to other reflected impulse radio signals 1402" (not shown) over time and generates a second waveform 1504a", 1504b" and 1504c" (similar to the second waveforms 1504a', 1504b' and 1504c' shown in FIG. 18b). Each second waveform 1504a", 1504b" and 1504c" is a time domain representation of the actual distortion of the transmitted Gaussian waveforms after being bounced of the intruder 1102" and filtered by the environment around the transmitting impulse radio unit 1000" and the receiving impulse radio units 900a", 900b" and 900c". In other words, the second waveforms 1504a", 1504b" and 1504c" each correspond to the received impulse shapes of the impulse radio signals 1402" that are received by each receiving impulse radio unit 900a", 900b" and 900c" when the intruder 1102" is located in or near the protection zone 1104c". A determination as to whether the intruder 1104" is actually inside the specially shaped protection zone 1104c" is made later by the processor 1802" associated with the transmitting impulse radio unit 1000".

Each of the receiving impulse radio units 900a", 900b" and 900c" includes a processor 1408" that compares the first waveform 1502a", 1502b" and 1502c" and the second waveform 1504a", 1504b" and 1504c" to determine whether there is a change between the first waveform 1502a", 1502b" and 1502c" and the second waveform 1504a", 1504b" and 1504c" caused by an intruder 1102" entering or coming near the protection zone 1104c". Like the first waveforms 1502a', 1502b' and 1502c' and the second waveforms 1504a', 1504b' and 1504c' shown in FIGS. 19a and 19b, each first waveform 1502a", 1502b" and 1502c" has an initial wavefront 1503a", 1503b" and 1503c" representative of the first received impulse radio pulses of the impulse radio signal 1402". Likewise, each second waveform 1504a", 1504b" and 1504c" has an initial wavefront 1506a", 1506b" and 1506c" representative of the first received impulse radio pulses in the subsequently received impulse radio signal 1402". In addition, the second waveforms 1504a", 1504b" and 1504c" each have a multipath reflection part 1508a", 1508b" and 1508c" caused by the intruder 1102" that was absent in the first waveforms 1502a", 1502b" and 1502c" but present in the second waveforms 1504a", 1504b" and 1504c". These multipath reflection parts 1508a", 1508b" and 1508c" are caused by the reception of the impulse radio signals 1402" that bounced off the intruder 1102" and passed over the indirect path 1406a", 1406b" and 1406c" between the transmitting impulse radio unit 1000" and the receiving impulse radio units 900a", 900b" and 900c". The distances "d1", "d2" and "d3" between direct and indirect paths can be calculated knowing the elapsed time "t1", "t2" and "t3" between the initial wavefront 1506a", 1506b" and 1506c" of the second waveforms 1504a", 1504b" and 1504c" and the multipath reflection part 1508a", 1508b" and 1508c". Again, a determination as to whether the intruder 1104" is actually inside the specially shaped protection zone 1104c" is made later by the processor 1802" associated with the transmitting impulse radio unit 1000".

It should be understood that there may be many items (e.g., walls, trees, furniture . . . ) within or near the protection zone 1104c" that could cause a multipath reflection part in the first waveform 1502a", 1502b" and 1502c" and the second waveforms 1504a", 1504b" and 1504c" but it is the difference between the two waveforms that indicates the presence of one or more intruders 1102".

After calculating the distances "d1", "d2" and "d3" between direct and indirect paths, each receiving impulse radio unit 900a", 900b" and 900c" forwards their calculated distance "d1", "d2" or "d3" to the transmitting impulse radio unit 1000". Thereafter, the transmitting impulse radio unit 1000" has a processor 1802" that use the distances "d1", "d2" and "d3" and the known positions of the receiving impulse radio units 900a", 900b" and 900c" to calculate the location within or near the protection zone 1104c" of the intruder 1102".

To do determine whether the intruder 1102" is actually within the protection zone 1104c" (as shown) or just near the protection zone 1104c", the processor 1802" would determine the location of the intruder 1102" and then compare this location to the two and possibly three-dimensional representation of the shape of the protection zone 1104c". Again, the position of intruder 1102" can be determined by the processor 1802" using a numerical algorithm such as Newton-Raphson method or some other techniques. Once the position and coordinates of the intruder 1102" are determined, various filtering techniques (e.g., Kalman filter) can be used by the intrusion detection system 1100" to track the movement of the intruder 1102" within the protection zone 1104c".

Figure 21A:
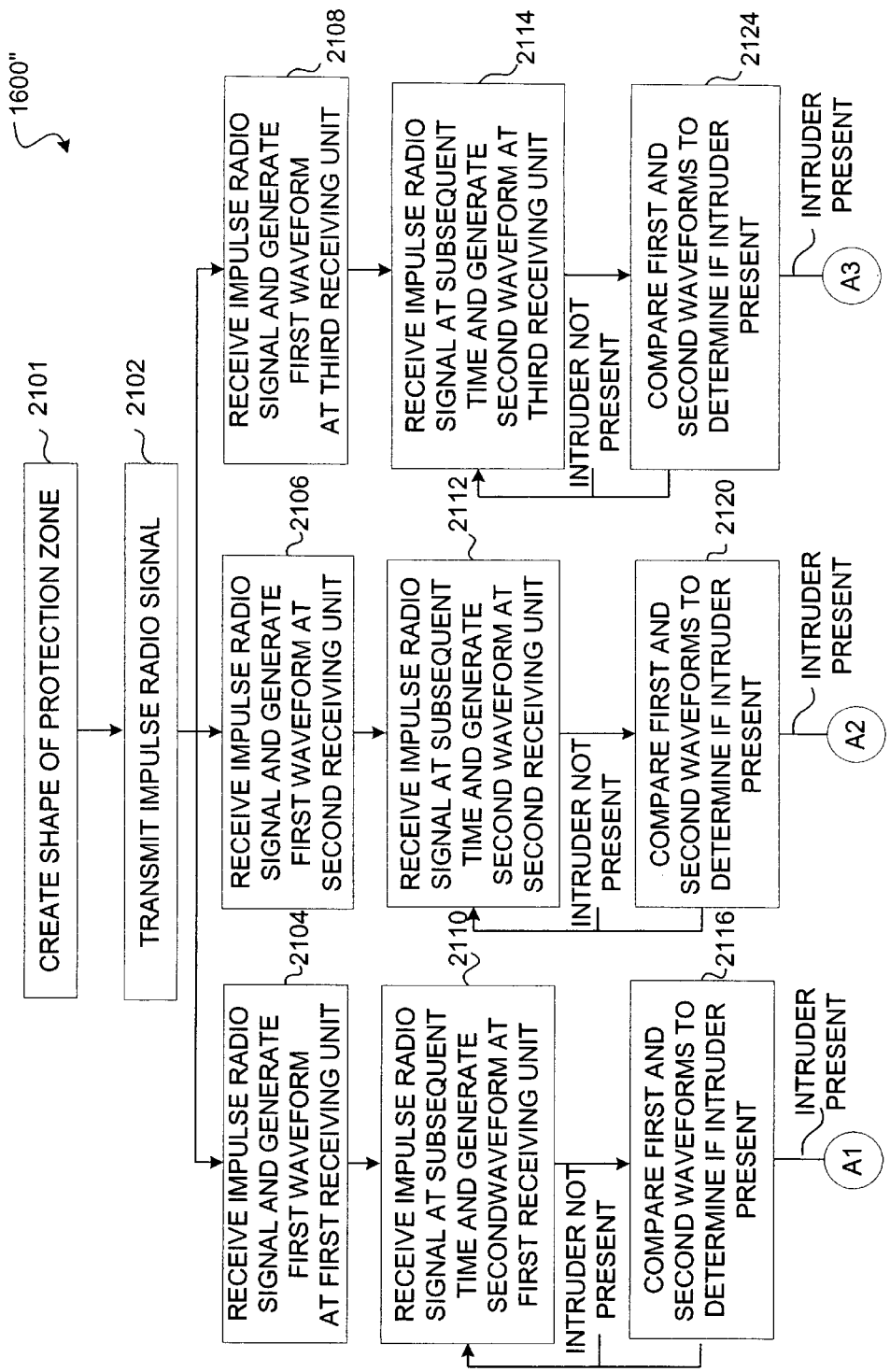
FIGS. 21a–21b illustrates a flowchart of the basic steps of a third embodiment of the preferred method in accordance with the present invention.
Figure 21B:
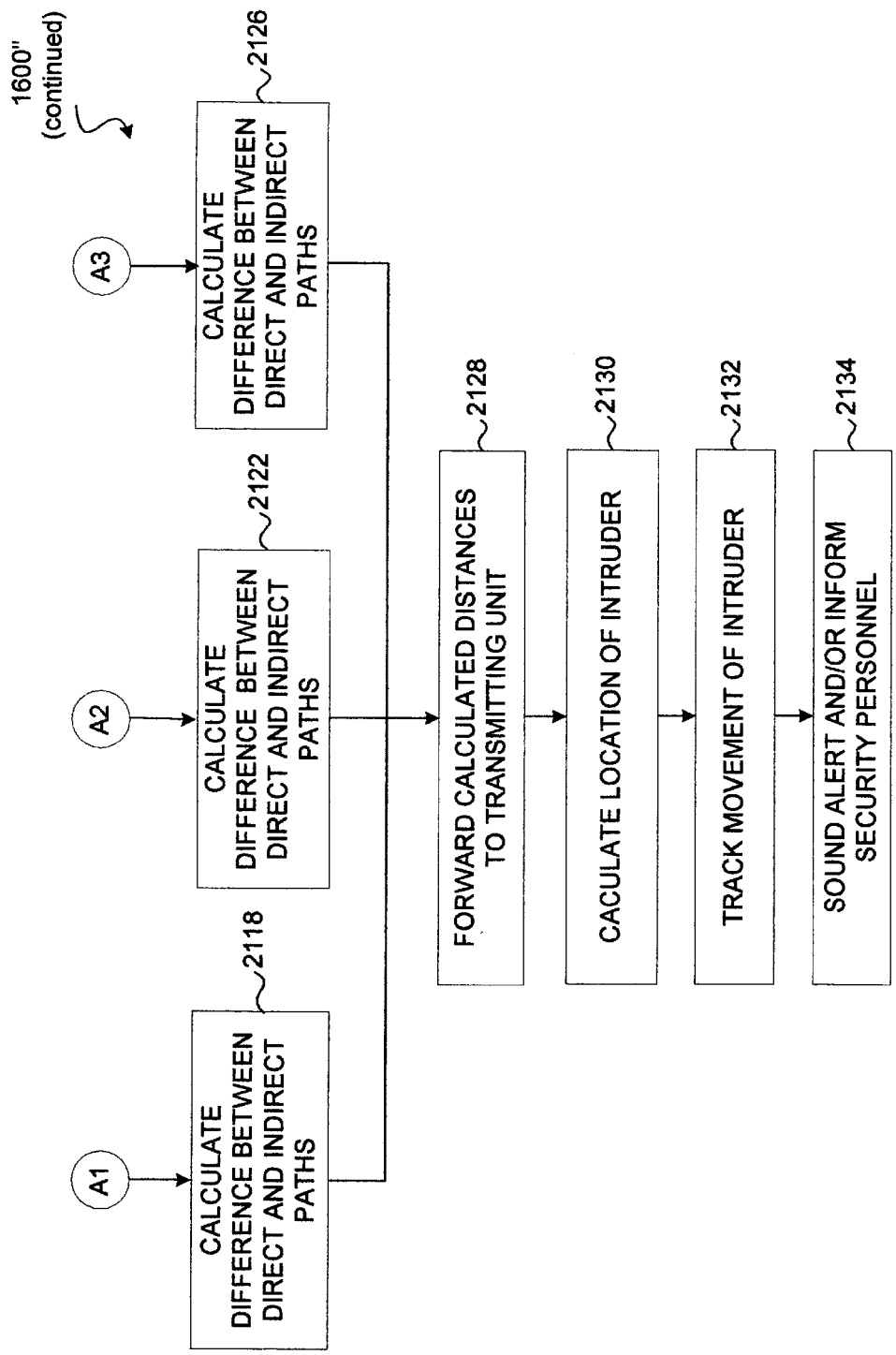

Referring to FIGS. 21a–21b, there is a flowchart illustrating the basic steps of a third embodiment of the preferred method 1600" of the present invention. Beginning at step 2101, prior to arming the intrusion detection system 1100", the system is put into a "learning mode". During the "learning mode", the test subject 2002" traverses the perimeter 2204" of the protection zone 1104c" to be protected and the intrusion detection system 1100" would track the test subject 2002" and build a two and possibly three-dimensional representation of the shape of the protection zone 1104c". The intrusion detection system 1100" can track the test subject 2002" in the same manner the intrusion detection system 1100' would track an intruder 1104' in the second embodiment.

At step 2102, after creating the shape of the protection zone 1104c", the transmitting impulse radio unit 1000" operates to transmit the impulse radio signal 1402". At this time, the impulse radio signal 1402" is made up of impulse radio pulses that are transmitted within and through a protection zone 1104c" that does not have an intruder 1102".

At step 2104, the first receiving impulse radio unit 900a" operates to receive the impulse radio signal 1402" and generate the first waveform 1502a". Again, the first receiving impulse radio unit 900a" receives the impulse radio signal 1402" and generates a first waveform 1502a" (e.g., see first waveform 1502a' in FIG. 19a) that is a time domain representation of the actual distortion of the transmitted Gaussian waveform after being filtered by the environment around the transmitting impulse radio unit 1000" and the receiving impulse radio units 900a", 900b" and 900c". At this time, the first waveform 1502a" corresponds to the received impulse shape of the impulse radio signal 1402" that is received by the first receiving impulse radio unit 900a" when there is no intruder 1102" located in or near the protection zone 1104c".

At step 2106, the second receiving impulse radio unit 900b" operates to receive the impulse radio signal 1402" and generate the first waveform 1502b". Again, the second receiving impulse radio unit 900b" receives the impulse radio signal 1402" and generates a first waveform 1502b" (e.g., see first waveform 1502b' in FIG. 18a) that is a time domain representation of the actual distortion of the transmitted Gaussian waveform after being filtered by the environment around the transmitting impulse radio unit 1000" and the receiving impulse radio units 900a", 900b" and 900c". At this time, the first waveform 1502b" corresponds to the received impulse shape of the impulse radio signal 1402" that is received by the second receiving impulse radio unit 900b" when there is no intruder 1102" located in or near the protection zone 1104c".

At step 2108, the third receiving impulse radio unit 900c" operates to receive the impulse radio signal 1402" and generate the first waveform 1502c". Again, the third receiving impulse radio unit 900c" receives the impulse radio signal 1402" and generates a first waveform 1502c" (e.g., see first waveform 1502c' in FIG. 18a) that is a time domain representation of the actual distortion of the transmitted Gaussian waveform after being filtered by the environment around the transmitting impulse radio unit 1000" and the receiving impulse radio units 900a", 900b" and 900c". At this time, the first waveform 1502c" corresponds to the received impulse shape of the impulse radio signal 1402" that is received by the third receiving impulse radio unit 900c" when there is no intruder 1102" located in or near the protection zone 1104c". It should be understood that steps 2104, 2106 and 2108 can take place in any order depending on the locations of the receiving impulse radio units 900a", 900b" and 900c" with respect to the location of the transmitting impulse radio unit 1000".

At step 2110 and at a subsequent time with respect to step 2304, the first receiving impulse radio unit 900a" operates to receive the impulse radio signal 1402" and generate the second waveform 1504a". In the present example, the second waveform 1504a" (e.g., see second waveform 1504a' in FIG. 18b) illustrates what the impulse radio signals 1402" received by the first receiving impulse radio unit 900a" looks like in the time domain with an intruder 1102" located in or near the protection zone 1104c". In other words, the second waveform 1502a" corresponds to the received impulse shape of the impulse radio signals 1402" that are received by the first receiving impulse radio unit 900a" over the direct path 1404a" and the indirect path 1406a" when the intruder 1102" is located in or near the protection zone 1104c". A determination as to whether the intruder 1104" is actually inside the specially shaped protection zone 1104c" is made later at step 2030 by the processor 1802" associated with the transmitting impulse radio unit 1000".

At step 2112 and at a subsequent time with respect to step 2308, the second receiving impulse radio unit 900b" operates to receive the impulse radio signal 1402" and generate the second waveform 1504b". In the present example, the second waveform 1504b" (e.g., see second waveform 1504b' in FIG. 18b) illustrates what the impulse radio signals 1402" received by the second receiving impulse radio unit 900b" looks like in the time domain with an intruder 1102" located in or near the protection zone 1104c". In other words, the second waveform 1502b" corresponds to the received impulse shape of the impulse radio signals 1402" that are received by the second receiving impulse radio unit 900b" over the direct path 1404b" and the indirect path 1406b" when the intruder 1102" is located in or near the protection zone 1104c". Again, a determination as to whether the intruder 1104" is actually inside the specially shaped protection zone 1104c" is made later at step 2130 by the processor 1802" associated with the transmitting impulse radio unit 1000".

At step 2114 and at a subsequent time with respect to step 2108, the third receiving impulse radio unit 900c" operates to receive the impulse radio signal 1402" and generate the second waveform 1504c". In the present example, the second waveform 1504c" (e.g., see second waveform 1504c' in FIG. 18b) illustrates what the impulse radio signals 1402" received by the third receiving impulse radio unit 900c" looks like in the time domain with an intruder 1102" located in or near the protection zone 1104c" . In other words, the second waveform 1502c" corresponds to the received impulse shape of the impulse radio signals 1402" that are received by the third receiving impulse radio unit 900c" over the direct path 1404c" and the indirect path 1406c" when the intruder 1102" is located in or near the protection zone 1104c". Again, a determination as to whether the intruder 1104" is actually inside the specially shaped protection zone 1104c" is made later at step 2030 by the processor 1802" associated with the transmitting impulse radio unit 1000". It should be understood that steps 2110, 2112 and 2114 can take place in any order depending on the locations of the receiving impulse radio units 900a", 900b" and 900c" with respect to the location of the transmitting impulse radio unit 1000".

At step 2116, the processor 1408a" within the first receiving impulse radio unit 900a" operates to compare the first waveform 1502a" and the second waveform 1504a" to determine whether there is a change between the first waveform 1502a" and the second waveform 1504a" caused by an intruder 1102" coming near or entering the protection zone 1104c". In the present example, there is a change between the first waveform 1502a" and the second waveform 1504a" because an intruder 1102" was not present when the first waveform 1502a" was generated but the intruder 1102" was present when the second waveform 1504a" was generated by the first receiving impulse radio unit 900a" (e.g., see first waveform 1502a' and second waveform 1504a' in FIGS. 18a–18b). This change is noticeable due to the presence of the multipath reflection part 1508a" caused by the intruder 1102". Of course, the first receiving impulse radio unit 900a" may generate many second waveforms at step 2110 in which there is no difference or very little difference with a first waveform because an intruder 1102" was not present. If an intruder 1102" is not within or near the protection zone 1104c" then the method 1600" returns to and repeats steps 2110 and 2116 until an intruder 1102" is determined to be within or near the protection zone 1104c".

At step 2118, if the intruder 1102" is determined to be within or near the protection zone 1104c", the processor 1408a" could then calculate the distance "d1" between direct and indirect paths by knowing the elapsed time "t1" between the initial wavefront 1506a" and the multipath reflection part 1508a" of the second waveform 1504a" (e.g., see second waveform 1504a' in FIG. 18b). For instance, the distance "d1" can be calculated to be 0.984 feet for each nanosecond in the elapsed time "t1" between the initial wavefront 1506a" and the multipath reflection part 1508a" of the second waveform 1504a" (e.g., see second waveform 1504a' in FIG. 18b). Again, a determination as to whether the intruder 1104" is actually inside the specially shaped protection zone 1104c" is made later at step 2130 by the processor 1802" associated with the transmitting impulse radio unit 1000".

At step 2120, the processor 1408b" within the second receiving impulse radio unit 900b" operates to compare the first waveform 1502b" and the second waveform 1504b" to determine whether there is a change between the first waveform 1502b" and the second waveform 1504b" caused by an intruder 1102" coming near or entering the protection zone 1104c". In the present example, there is a change between the first waveform 1502b" and the second waveform 1504b" because an intruder 1102" was not present when the first waveform 1502b" was generated but the intruder 1102" was present when the second waveform 1504b" was generated by the second receiving impulse radio unit 900b" (e.g., see first waveform 1502b' and second waveform 1504b' in FIGS. 18a–18b). This change is noticeable due to the presence of the multipath reflection part 1508b" caused by the intruder 1102". Of course, the second receiving impulse radio unit 900b" may generate many second waveforms at step 2112 in which there is no difference or very little difference with a first waveform because an intruder 1102" was not present. If an intruder 1102" is not within or near the protection zone 1104*c*" then the method 1600" returns to and repeats steps 2112 and 2120 until an intruder 1102" is determined to be within or near the protection zone 1104*c*".

At step 2122, if the intruder 1102" is determined to be within or near the protection zone 1104*c*", the processor 1408*b*" could then calculate the distance "d2" between direct and indirect paths by knowing the elapsed time "t2", between the initial wavefront 1506*b*" and the multipath reflection part 1508*b*" of the second waveform 1504*b*" (e.g., see second waveform 1504*b*' in FIG. 18*b*). For instance, the distance "d2" can be calculated to be 0.984 feet for each nanosecond in the elapsed time "t2" between the initial wavefront 1506*b*" and the multipath reflection part 1508*b*" of the second waveform 1504*b*" (e.g., see second waveform 1504*b*' in FIG. 18*b*). Again, a determination as to whether the intruder 1104" is actually inside the specially shaped protection zone 1104*c*" is made later at step 2030 by the processor 1802" associated with the transmitting impulse radio unit 1000".

At step 2124, the processor 1408*c*" within the third receiving impulse radio unit 900*c*" operates to compare the first waveform 1502*c*" and the second waveform 1504*c*" to determine whether there is a change between the first waveform 1502*c*" and the second waveform 1504*c*" caused by an intruder 1102" coming near or entering the protection zone 1104*c*". In the present example, there is a change between the first waveform 1502*c*" and the second waveform 1504*c*" because an intruder 1102" was not present when the first waveform 1502*c*" was generated but the intruder 1102" was present when the second waveform 1504*c*" was generated by the third receiving impulse radio unit 900*c*" (e.g., see first waveform 1502*c*' and second waveform 1504*c*' in FIGS. 18*a*–18*b*). This change is noticeable due to the presence of the multipath reflection part 1508*c*" caused by the intruder 1102". Of course, the third receiving impulse radio unit 900*c*" may generate many second waveforms at step 2314 in which there is no difference or very little difference with a first waveform because an intruder 1102" was not present. If an intruder 1102" is not within or near the protection zone 1104*c*" then the method 1600" returns to and repeats steps 2114 and 2124 until an intruder 1102" is determined to be within or near the protection zone 1104*c*".

At step 2126, if the intruder 1102" is determined to be within or near the protection zone 1104*c*", the processor 1408*c*" could then calculate the distance "d3" between direct and indirect paths by knowing the elapsed time "t3" between the initial wavefront 1506*c*" and the multipath reflection part 1508*c*" of the second waveform 1504*c*" (e.g., see second waveform 1504*c*' in FIG. 18*b*). For instance, the distance "d3" can be calculated to be 0.984 feet for each nanosecond in the elapsed time "t3" between the initial wavefront 1506*c*" and the multipath reflection part 1508*c*" of the second waveform 1504*c*" (e.g., see second waveform 1504*c*' in FIG. 18*b*). Again, a determination as to whether the intruder 1104" is actually inside the specially shaped protection zone 1104*c*" is made later at step 2030 by the processor 1802" associated with the transmitting impulse radio unit 1000".

At step 2128, after calculating the distances "d1", "d2" and "d3" between direct and indirect paths, each receiving impulse radio unit 900*a*", 900*b*" and 900*c*" forwards their calculated distance "d1", "d2" or "d3" to the transmitting impulse radio unit 1000".

At step 2130, the transmitting impulse radio unit 1000" has a processor 1802" that use the distances "d1", "d2" and "d3" and the known positions of the receiving impulse radio units 900*a*", 900*b*" and 900*c*" to calculate the location of the intruder 1102" within or near the protection zone 1104*c*". To determine whether the intruder 1102' is actually within the protection zone 1104*c*" or just near the protection zone 1104*c*", the processor 1802" would determine the location of the intruder 1102" and then compare this location to the two and possibly three-dimensional representation of the shape of the protection zone 1104*c*". Again, the position of intruder 1102" can be determined by the processor 1802" using a numerical algorithm such as Newton-Raphson method or some other techniques.

At step 2132, once the position and coordinates of the intruder 1102" are determined at step 2130, then various filtering techniques (e.g., Kalman filter) can be used by the intrusion detection system 1100" to track the movement of the intruder 1102" within the protection zone 1104*c*".

At step 2134, the intrusion detection system 1100" sounds an alarm and/or informs remote security personnel when there is an intruder 1102" located within (or near) the protection zone 1104*c*". For extra security, the intrusion detection system 1100" can use impulse radio technology to alert the remote security personnel.

Figure 22:
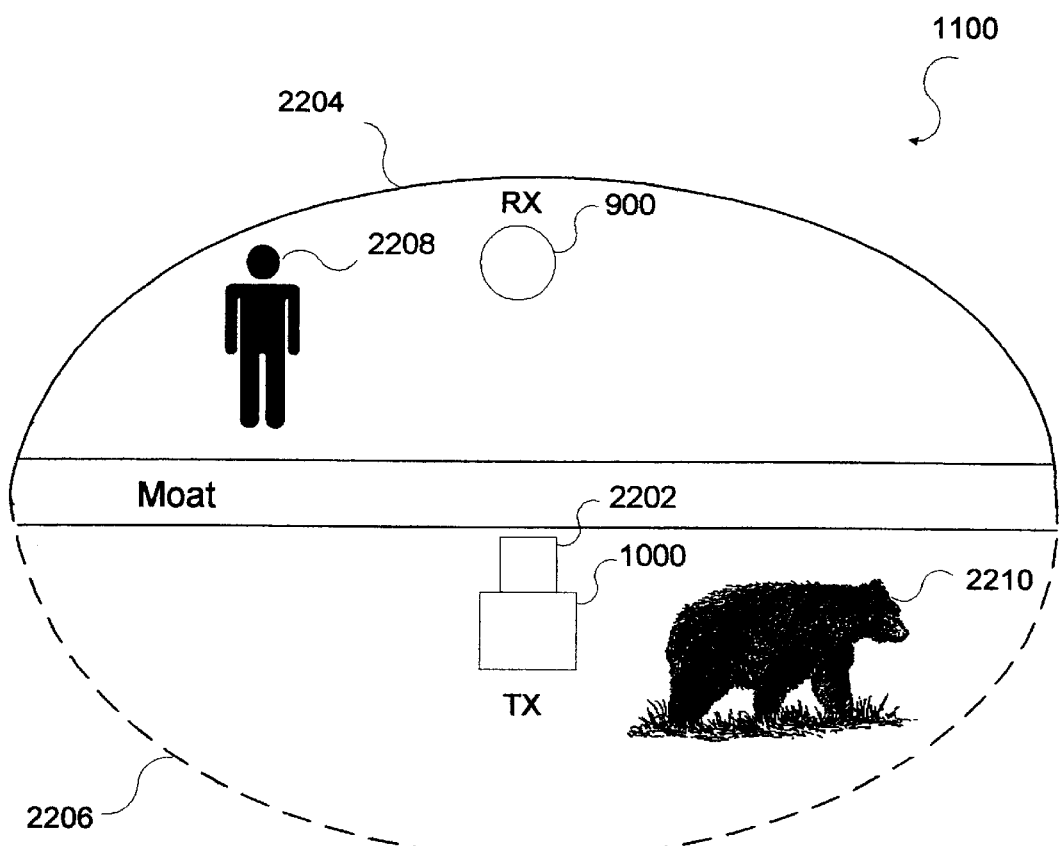
FIG. 22 illustrates a diagram of the intrusion detection system incorporating one or more directive antennas.

Referring to FIG. 22, there is illustrated a diagram of the intrusion detection system 1100, 1100' and 1100" that uses one or more directive antennas 2202. As shown, the transmitting impulse radio unit 1000, 1000' and 1000" (only one shown) can use the directive antenna 2202 (only one shown) to transmit the impulse radio signal in a predetermined direction such that radar is sensitive in a particular area 2204 (see solid line) and not sensitive in another area 2206 (see dashed line). In particular, the intrusion detection system 1100, 1100' and 1100" that uses an directive antenna 2202 can make the radar sensitive in a particular area 2204 to detect a person 2208 or a dangerous animal 2210 that is not supposed to be located in that area 2204 and at the same time the directive antenna 2202 does not make the radar sensitive in another area 2206 in which the dangerous animal 2210 is suppose to be located. It should be understood that the directive antenna 2202 can take many different forms including, for example, a 180° directive antenna and a 90° directive antenna. Moreover, it should also be understood that a directional antenna 2202 could be placed at the receiving impulse radio unit 900, 900' and 900" or at both the receiving and transmitting impulse radio units.

From the foregoing, it can be readily appreciated by those skilled in the art that the present invention provides an intrusion detection system and method that can utilize impulse radio technology to detect when an intruder has entered a protection zone. In addition, the intrusion detection system and method can utilize impulse radio technology to determine a location of the intruder within the protection zone and also to track the movement of the intruder within the protection zone. Moreover, the intrusion detection system and method can utilize impulse radio technology to create a specially shaped protection zone before trying to detect when and where the intruder has penetrated and moved within the protection zone. There are many possible applications for using the present invention such as setting-up a security screen in a home/apartment (or just certain rooms in the home/apartment), setting-up a security screen around a swimming pool . . . .

Although various embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A security system comprising:
 a transmitting impulse radio unit for transmitting an impulse radio signal including a series of impulses;
 a receiving impulse radio unit for receiving the impulse radio signal at and after a predetermined time and generating a first waveform which is a time domain representation of the received impulse radio signal that indicates an actual distortion of the transmitted impulse radio signal that was transmitted within a protection zone at and after the predetermined time;
 said receiving impulse radio unit for receiving the impulse radio signal at and after a subsequent time and generating a second waveform which is a time domain representation of the received impulse radio signal that indicates an actual distortion of the transmitted impulse radio signal that was transmitted within the protection zone at and after the subsequent time; and
 a processor for comparing the first waveform to the second waveform to determine whether there is a change between the first waveform and the second waveform caused by an intruder entering the protection zone.

2. The security system of claim 1, wherein said change between the first waveform and the second waveform is a multipath reflection part caused by the intruder.

3. The security system of claim 1, further comprising at least two more receiving impulse radio units that interact with the transmitting impulse radio unit and enable a current position of the intruder to be determined within the protection zone.

4. The security system of claim 3, wherein said transmitting impulse radio unit interacts with each of the receiving impulse radio units to track the movement of a test subject so as to create a shape of the protection zone.

5. The security system of claim 1, wherein said receiving impulse radio unit further includes an ultra-wideband scanning receiver.

6. The security system of claim 1, wherein the transmitted impulse radio signal is a transmitted Gaussian waveform having a known pseudorandom sequence of pulses.

7. A method for detecting an intruder, said method comprising the steps of:
 transmitting, from a transmitting impulse radio unit, an impulse radio signal including a series of impulses;
 receiving, at a receiving impulse radio unit during a first interval of time, the impulse radio signal;
 generating, at the receiving impulse radio unit, a first waveform which is a time domain representation of the received impulse radio signal that indicates an actual distortion of the transmitted impulse radio signal that was transmitted within a protection zone during the first interval of time;
 receiving, at the receiving impulse radio unit during a second interval of time, the impulse radio signal;
 generating, at the receiving impulse radio unit, a second waveform which is a time domain representation of the received impulse radio signal that indicates an actual distortion of the transmitted impulse radio signal that was transmitted within the protection zone during the second interval of time; and
 comparing the first waveform to the second waveform to determine whether there is a change between the first waveform and the second waveform caused by the intruder entering the protection zone.

8. The method of claim 7, further comprising the step of determining a distance between the intruder and the receiving impulse radio unit by calculating an elapsed time between an initial wavefront and a multipath reflection part of the second waveform caused by the intruder.

9. The method of claim 8, further comprising the steps of:
 receiving, at a second receiving impulse radio unit during the first interval of time, the impulse radio signal;
 generating, at the second receiving impulse radio unit, a first waveform which is a time domain representation of the received impulse radio signal that indicates an actual distortion of the transmitted impulse radio signal that was transmitted within the protection zone during the first interval of time;
 receiving, at the second receiving impulse radio unit during the second interval of time, the impulse radio signal;
 generating, at the second receiving impulse radio unit, a second waveform which is a time domain representation of the received impulse radio signal that indicates an actual distortion of the transmitted impulse radio signal that was transmitted within the protection zone during the second interval of time;
 comparing the first waveform to the second waveform both of which were generated by the second receiving impulse radio unit to determine whether there is a change caused by the intruder entering the protection zone;
 determining a distance between the intruder and the second receiving impulse radio unit by calculating an elapsed time between an initial wavefront and a multipath reflection part of the second waveform generated by the second receiving impulse radio unit that was caused by the intruder;
 receiving, at a third receiving impulse radio unit during the first interval of time, the impulse radio signal;
 generating, at the third receiving impulse radio unit, a first waveform which is a time domain representation of the received impulse radio signal that indicates an actual distortion of the transmitted impulse radio signal that was transmitted within the protection zone during the first interval of time;
 receiving, at the third receiving impulse radio unit during the second interval of time, the impulse radio signal;
 generating, at the third receiving impulse radio unit, a second waveform which is a time domain representation of the received impulse radio signal that indicates an actual distortion of the transmitted impulse radio signal that was transmitted within the protection zone during the second interval of time;
 comparing the first waveform to the second waveform both of which were generated by the third receiving impulse radio unit to determine whether there is a change caused by the intruder entering the protection zone;
 determining a distance between the intruder and the third receiving impulse radio unit by calculating an elapsed time between an initial wavefront and a multipath reflection part of the second waveform generated by the third receiving impulse radio unit that was caused by the intruder; and
 determining a current position of the intruder in the protection zone using the determined distances between the intruder and the first, second and third receiving impulse radio units.

10. The method of claim 7, further comprising the step of enabling a current position of the intruder to be determined within the protection zone by utilizing at least one more receiving impulse radio unit that interacts with the transmitting impulse radio unit.

11. The method of claim 7, further comprising the step of creating a shape of the protection zone.

12. The method of claim 11 wherein said step of creating a shape of the protection zone further includes the steps of,:
   determining a current position of a test subject by utilizing at least two more receiving impulse radio units; and
   tracking the movement of the test subject to outline the shape of the protection zone.

13. The method of claim 7, further comprising the step of alerting security personnel when the intruder has entered the protection zone.

14. A security system comprising:
   a transmitting impulse radio unit that transmits an impulse radio signal;
   a plurality of receiving impulse radio units each of which receives the impulse radio signal at and after a predetermined time and generates a first waveform which is a time domain representation of the received impulse radio signal that indicates an actual distortion of the transmitted impulse radio signal that was transmitted within a protection zone at and after the predetermined time;
   each of said plurality of receiving impulse radio units receives the impulse radio signal at and after a subsequent time and generates a second waveform which is a time domain representation of the received impulse radio signal that indicates an actual distortion of the transmitted impulse radio signal that was transmitted within the protection zone at and after the subsequent time, each receiving impulse radio unit further includes:
      a processor compares the first waveform to the second waveform to determine whether an intruder entered the protection zone and then determines a distance between the intruder and the respective receiving impulse radio unit by calculating an elapsed time between an initial wavefront and a multipath reflection part of the second waveform generated by the respective receiving impulse radio unit caused by the intruder;
   each of said plurality of receiving impulse radio units transmits the determined distance between the intruder and the respective receiving impulse radio unit to said transmitting impulse radio unit; and
   said transmitting impulse radio unit calculates a current position of the intruder using the determined distances.

15. The security system of claim 14, wherein said transmitting impulse radio unit interacts with each of the receiving impulse radio units to track the movement of a test subject and create a shape of the protection zone.

16. The security system of claim 14, wherein each of said plurality of receiving impulse radio units further includes an ultra-wideband scanning receiver.

17. The security system of claim 14, wherein the transmitted first impulse radio signal and the transmitted second impulse radio signal are each a transmitted Gaussian waveform having a known pseudorandom sequence of pulses.

18. An intrusion detection system comprising:
   a transmitting impulse radio unit that transmits an impulse radio signal including a series of impulses; and
   a receiving impulse radio unit that compares at least two waveforms each of which is a time domain representation of the received impulse radio signal that indicates an actual distortion of the transmitted impulse radio signal that was transmitted during a predetermined time interval within a protection zone to determine whether the protection zone has been breached by an intruder.

19. The intrusion detection system of claim 18, further comprising at least one more receiving impulse radio units that interact with and enable the transmitting impulse radio unit to determine a current position of the intruder within the protection zone.

20. The intrusion detection system of claim 19, wherein said transmitting impulse radio unit interacts with each of the receiving impulse radio units to track the movement of a test subject so as to create a shape of the protection zone.

21. The intrusion detection system of claim 19, wherein said transmitting impulse radio unit further includes at least one directive antenna.

22. The intrusion detection system of claim 21, wherein said at least one directive antenna enables the transmitting impulse radio unit to transmit the impulse radio signal in a predetermined direction.

* * * * *